United States Patent
Sudo

(10) Patent No.: US 9,784,955 B2
(45) Date of Patent: Oct. 10, 2017

(54) ZOOM LENS AND IMAGE PICKUP APPARATUS INCLUDING THE SAME

(71) Applicant: CANON KABUSHIKI KAISHA, Tokyo (JP)

(72) Inventor: Kenta Sudo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/187,511

(22) Filed: Jun. 20, 2016

(65) Prior Publication Data

US 2017/0003485 A1 Jan. 5, 2017

(30) Foreign Application Priority Data

Jun. 30, 2015 (JP) .................................. 2015-132148

(51) Int. Cl.
G02B 15/14 (2006.01)
G02B 15/173 (2006.01)

(52) U.S. Cl.
CPC .................. *G02B 15/173* (2013.01)

(58) Field of Classification Search
CPC ...................................................... G02B 15/20
USPC ................................................. 359/684, 687
See application file for complete search history.

(56) References Cited

U.S. PATENT DOCUMENTS

2015/0253551 A1* 9/2015 Obama ................ G02B 15/173
359/557

FOREIGN PATENT DOCUMENTS

| JP | 2005-055625 A | 3/2005 |
| JP | 2005-308963 A | 11/2005 |
| JP | 2009-104160 A | 5/2009 |

* cited by examiner

*Primary Examiner* — James Jones
(74) *Attorney, Agent, or Firm* — Canon USA Inc., IP Division

(57) ABSTRACT

In a zoom lens including a first lens unit having a positive refractive power, a second lens unit having a negative refractive power, and a third lens unit having a positive refractive power that are arranged in order from an object side to an image side, a movement locus of each of the lens units, an amount of movement of the third lens unit when zooming from a wide angle end to a telephoto end, and a focal length of the third lens unit are set as appropriate.

18 Claims, 17 Drawing Sheets

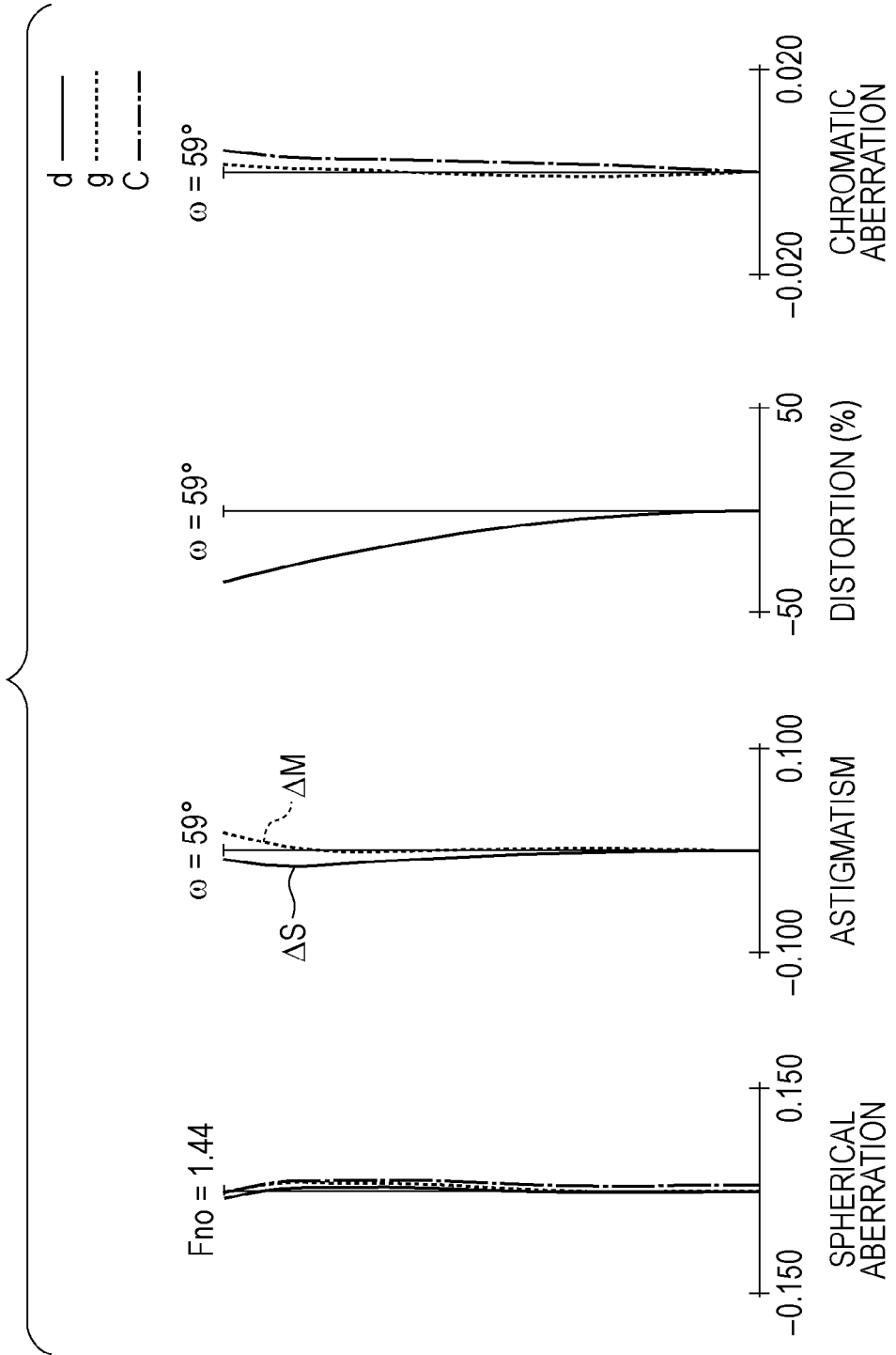

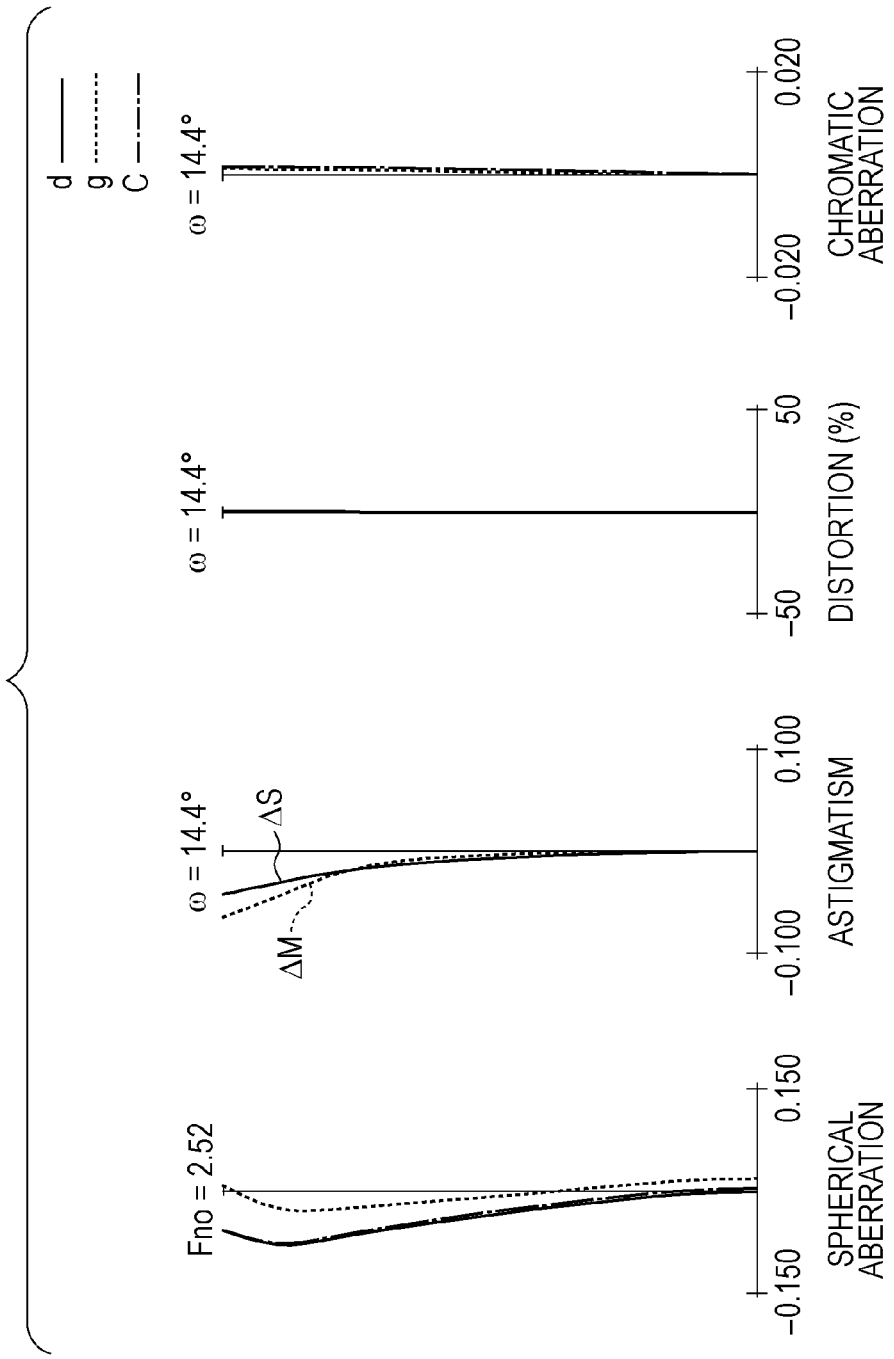

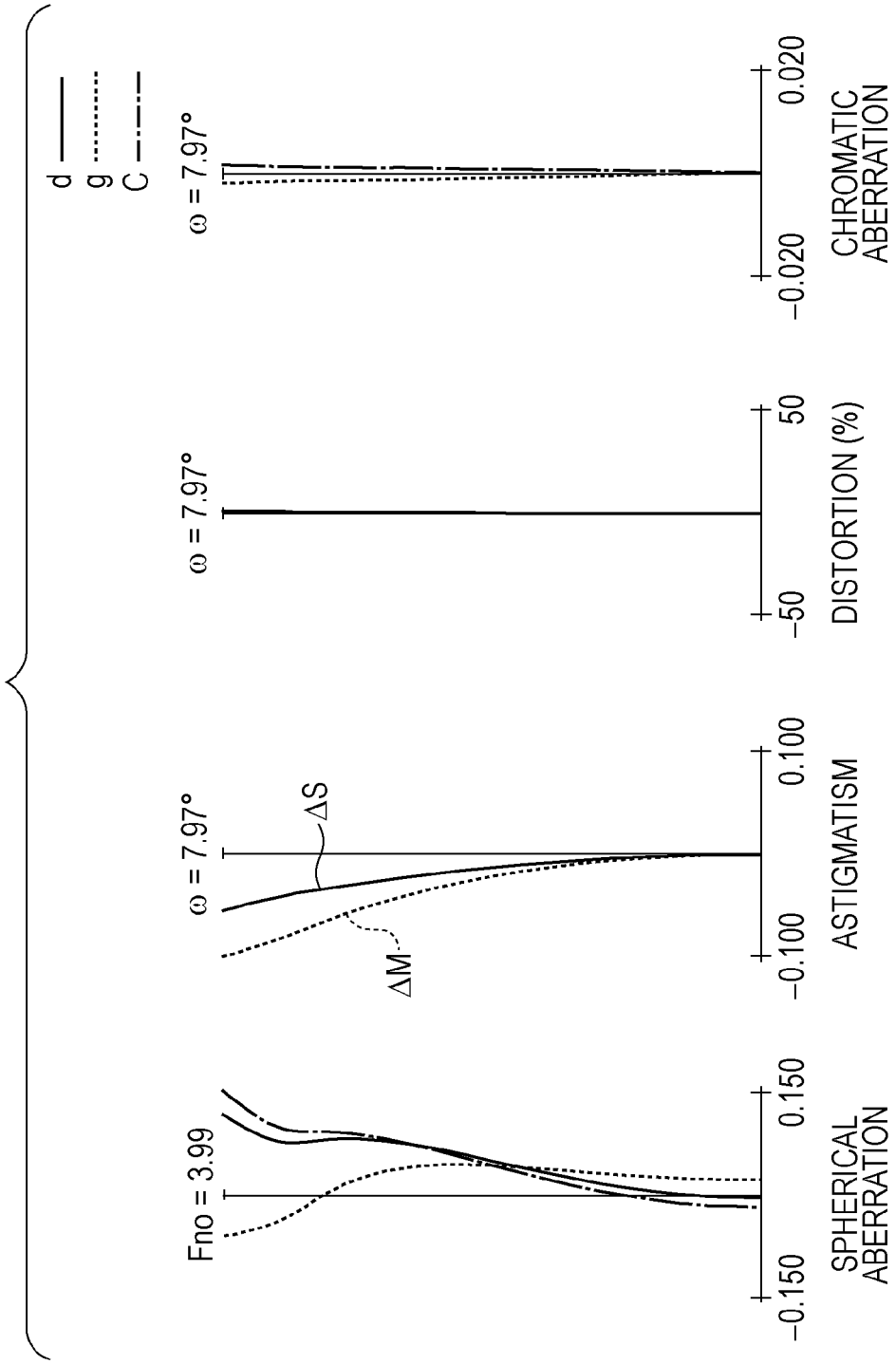

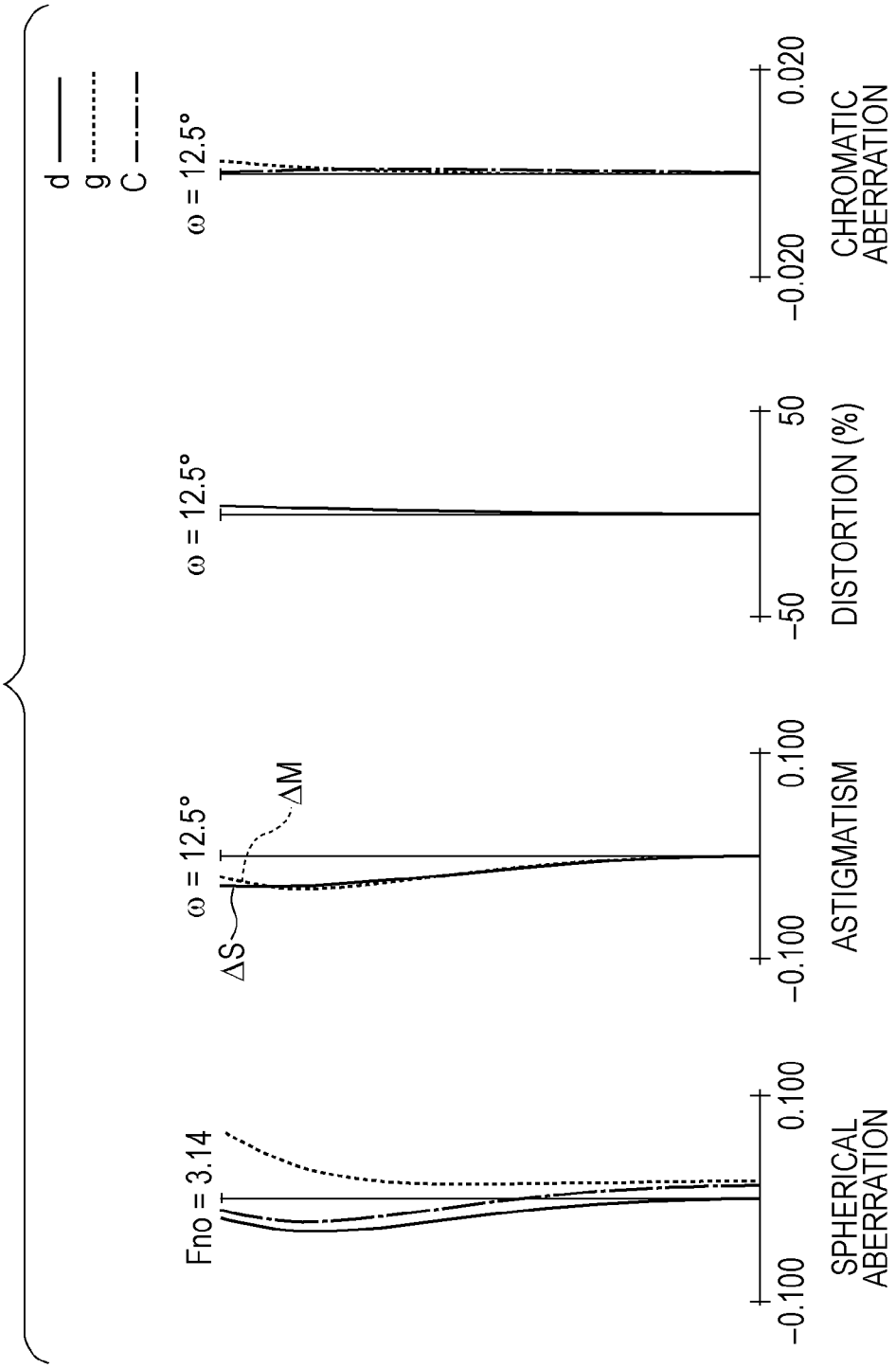

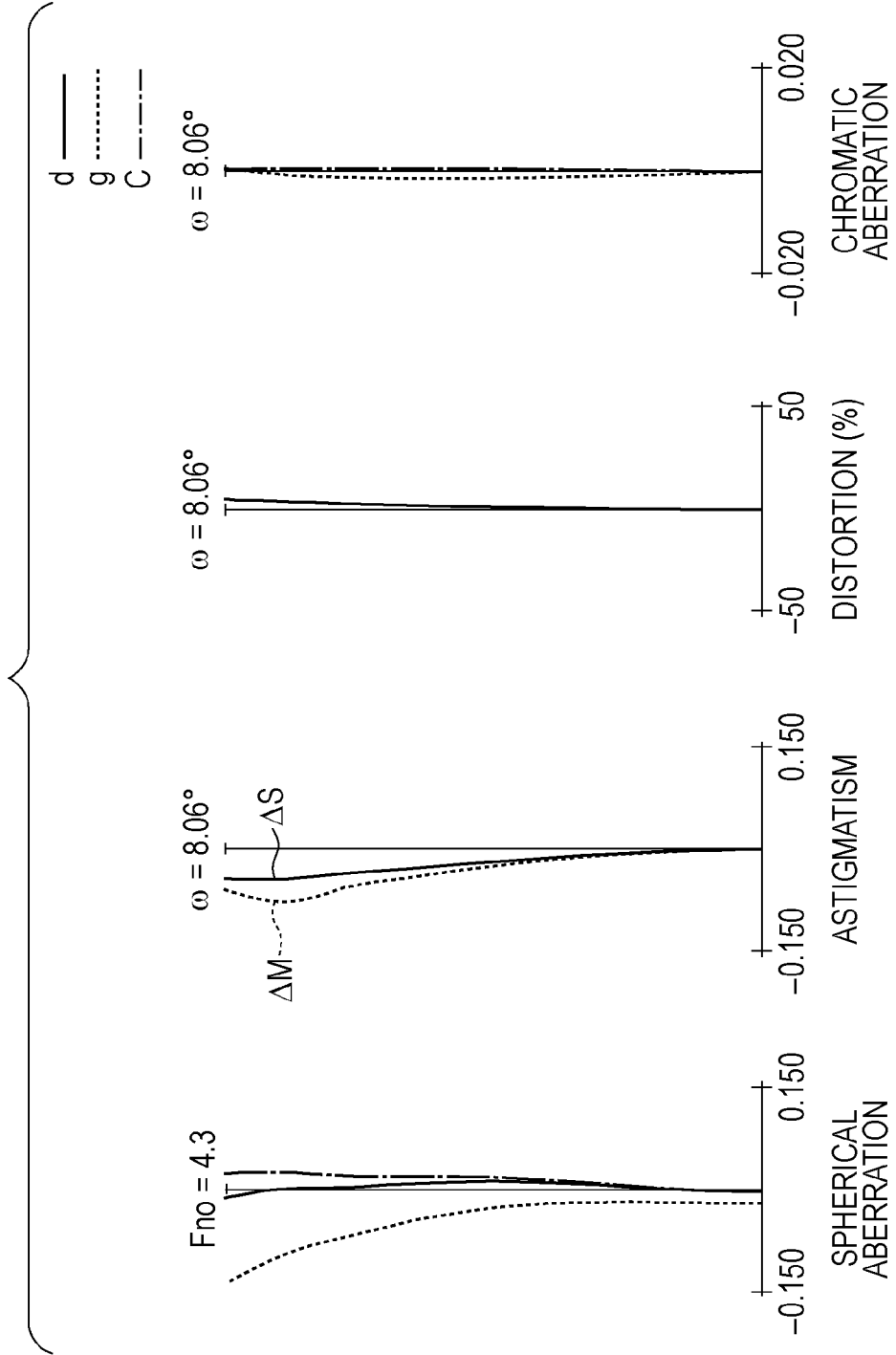

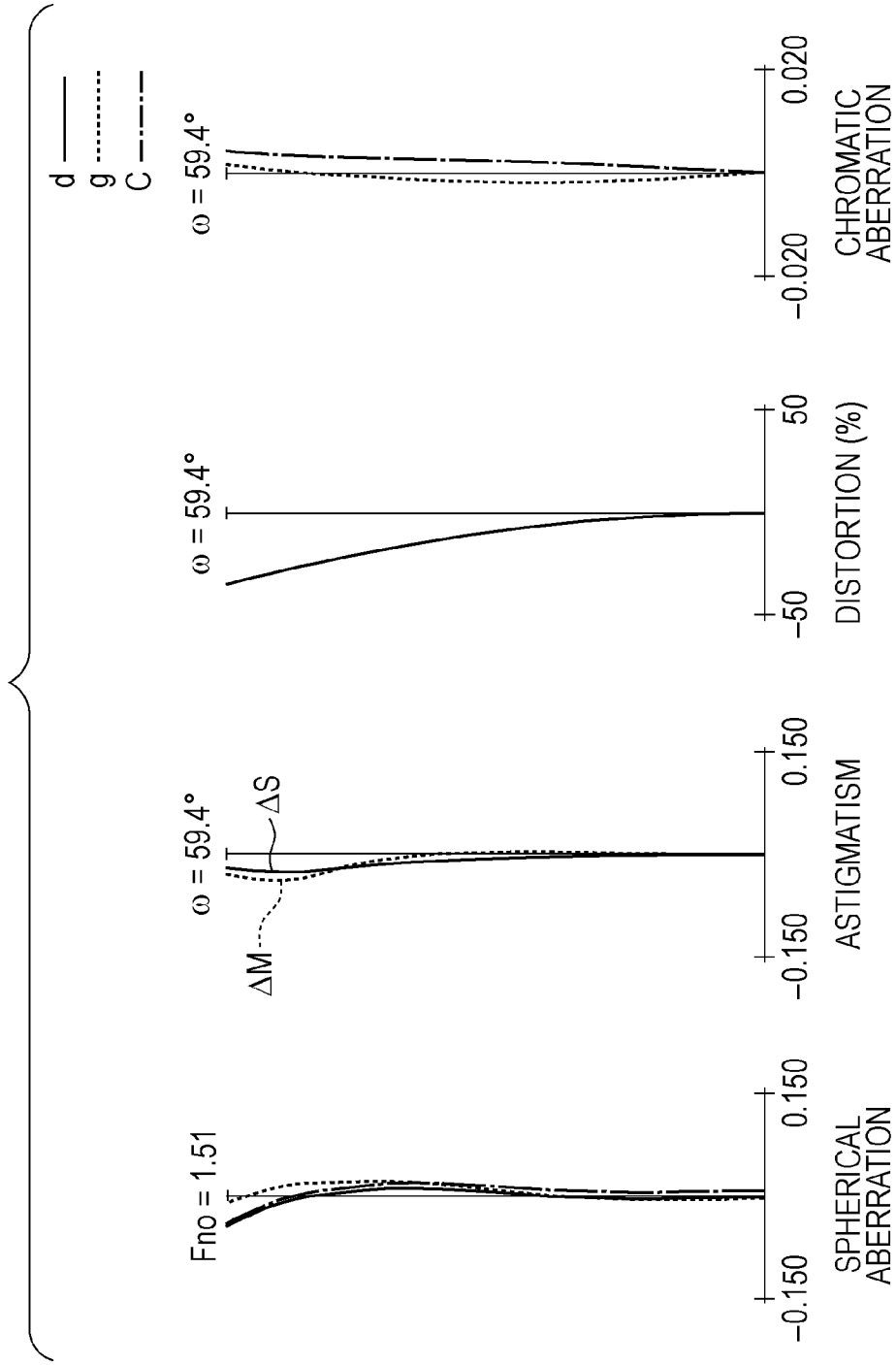

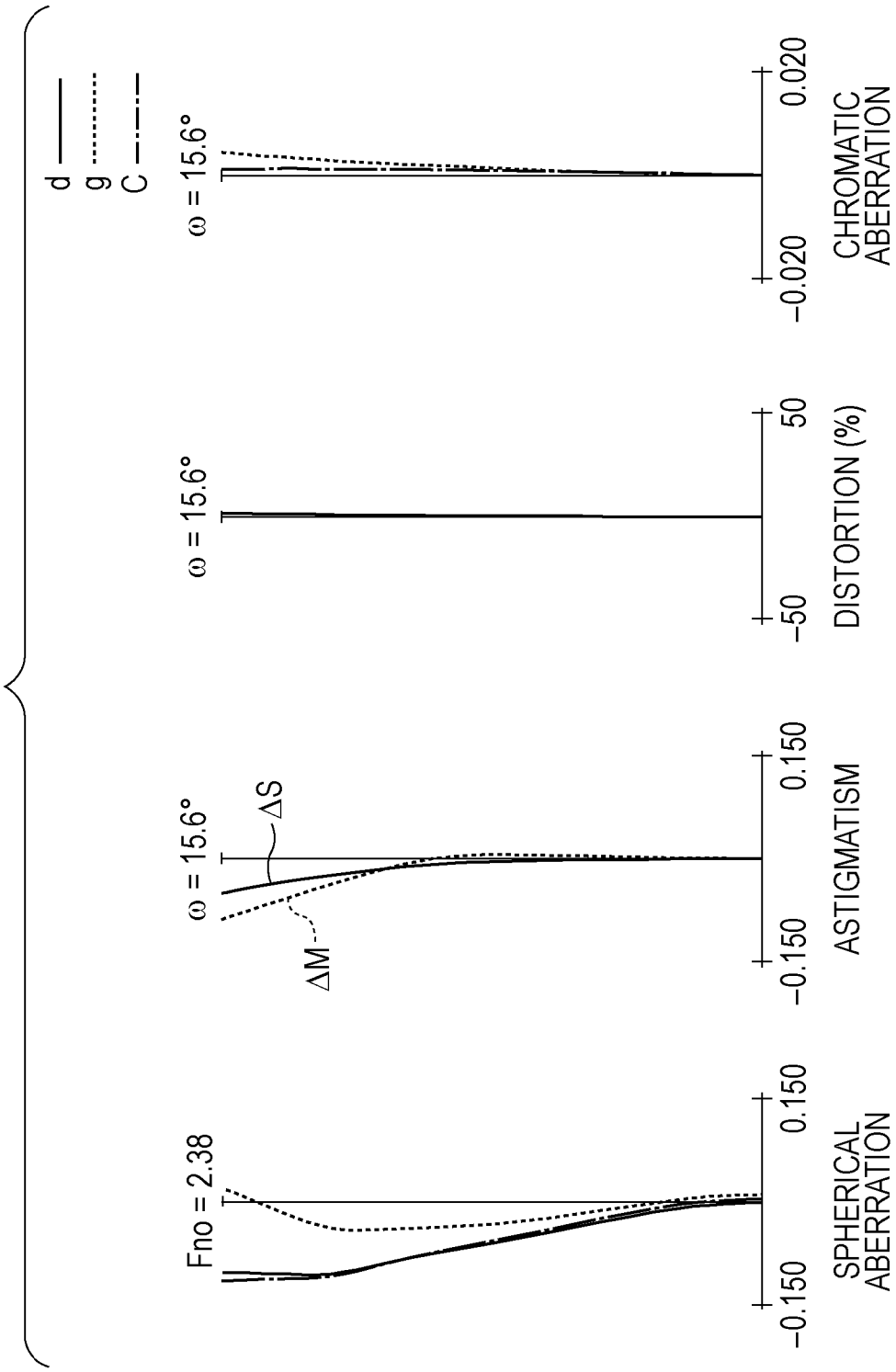

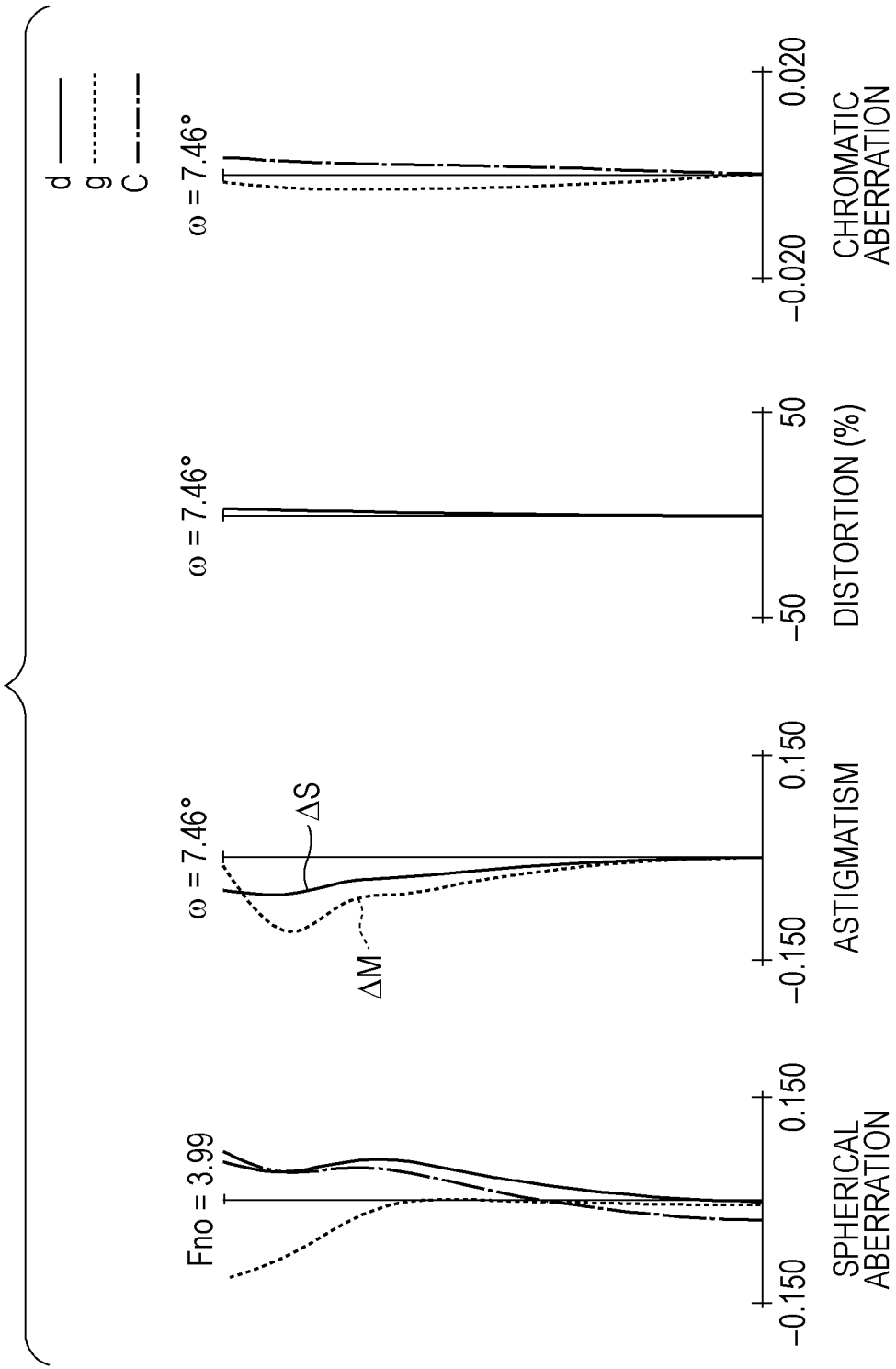

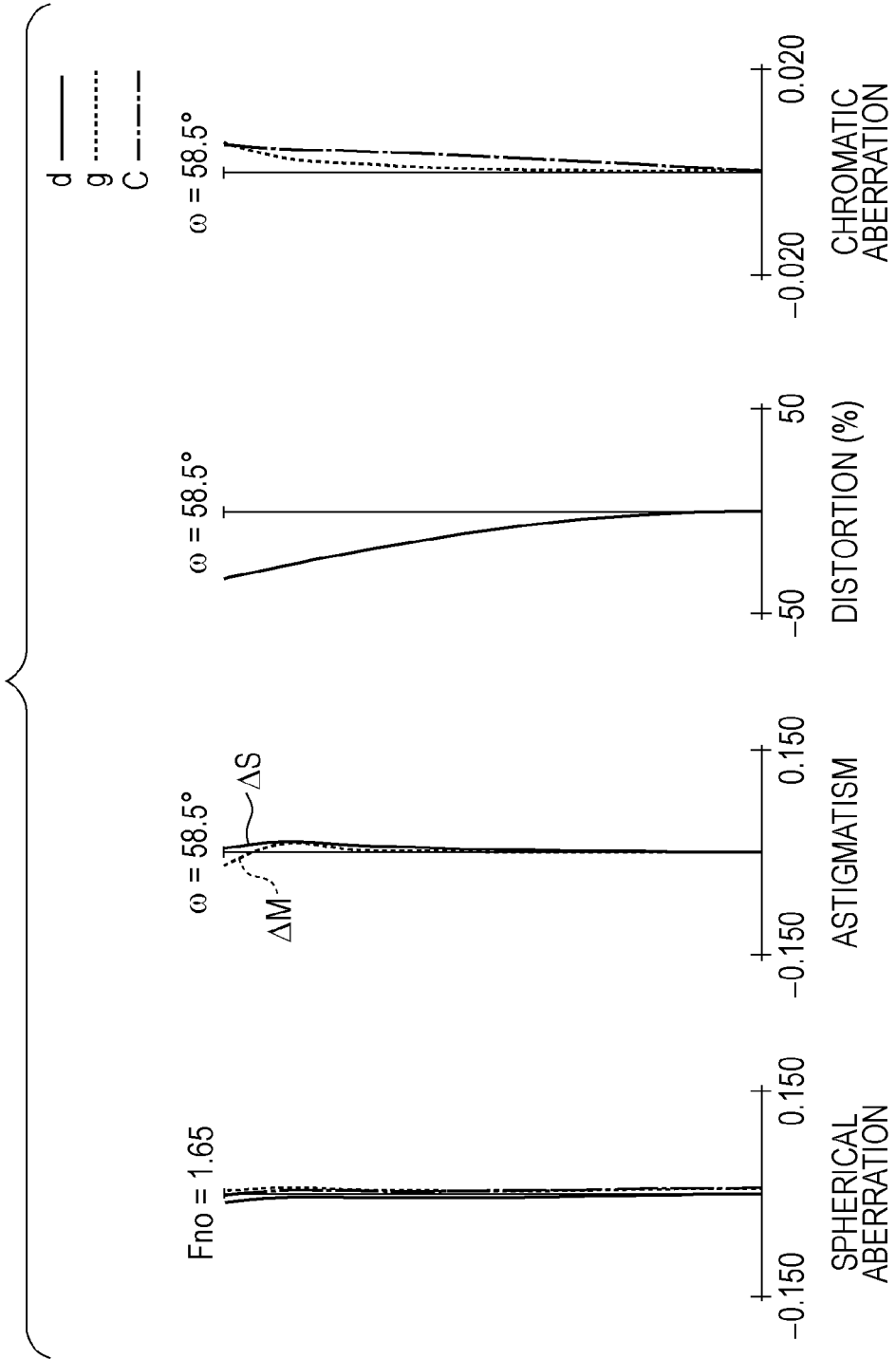

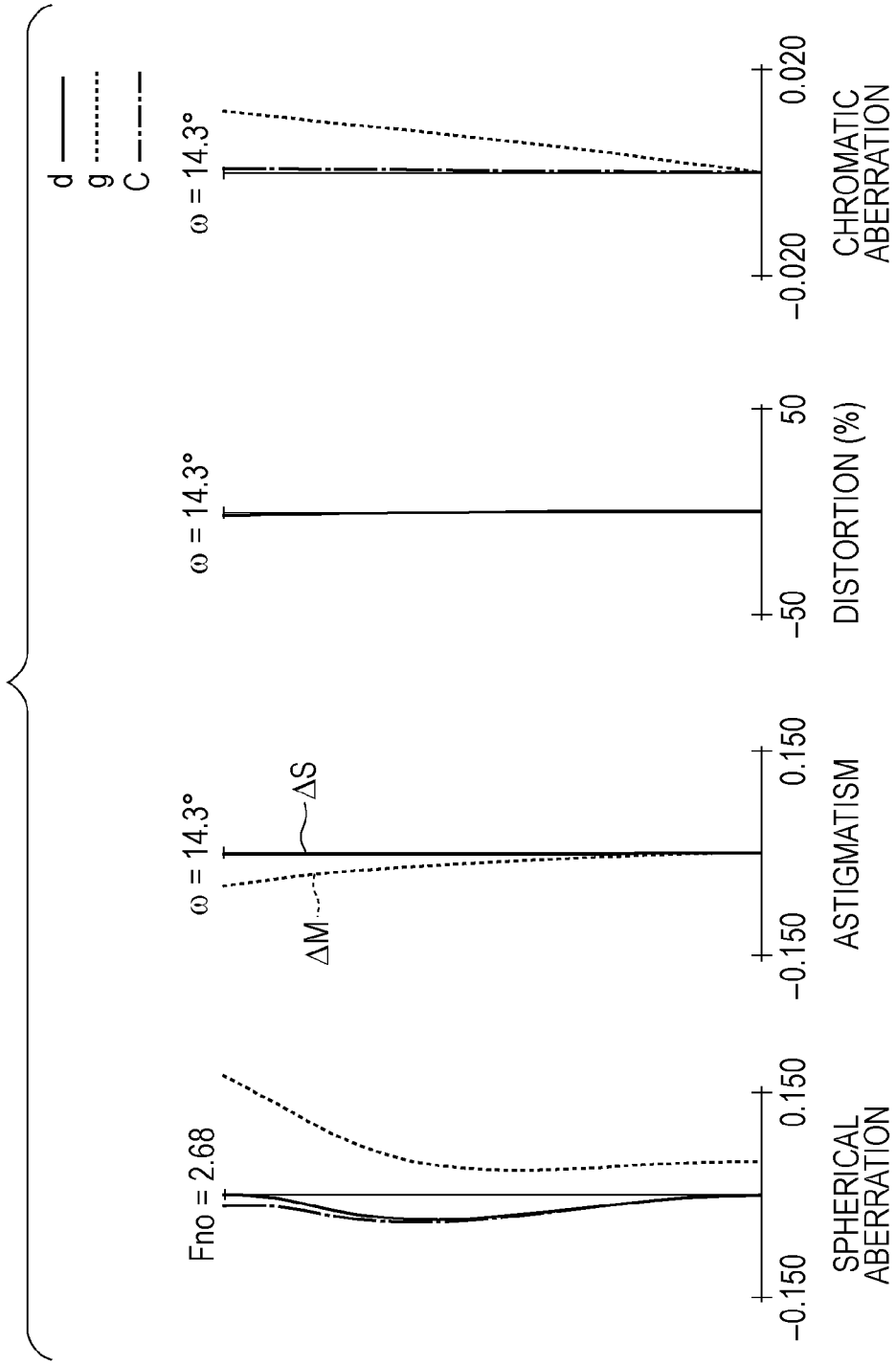

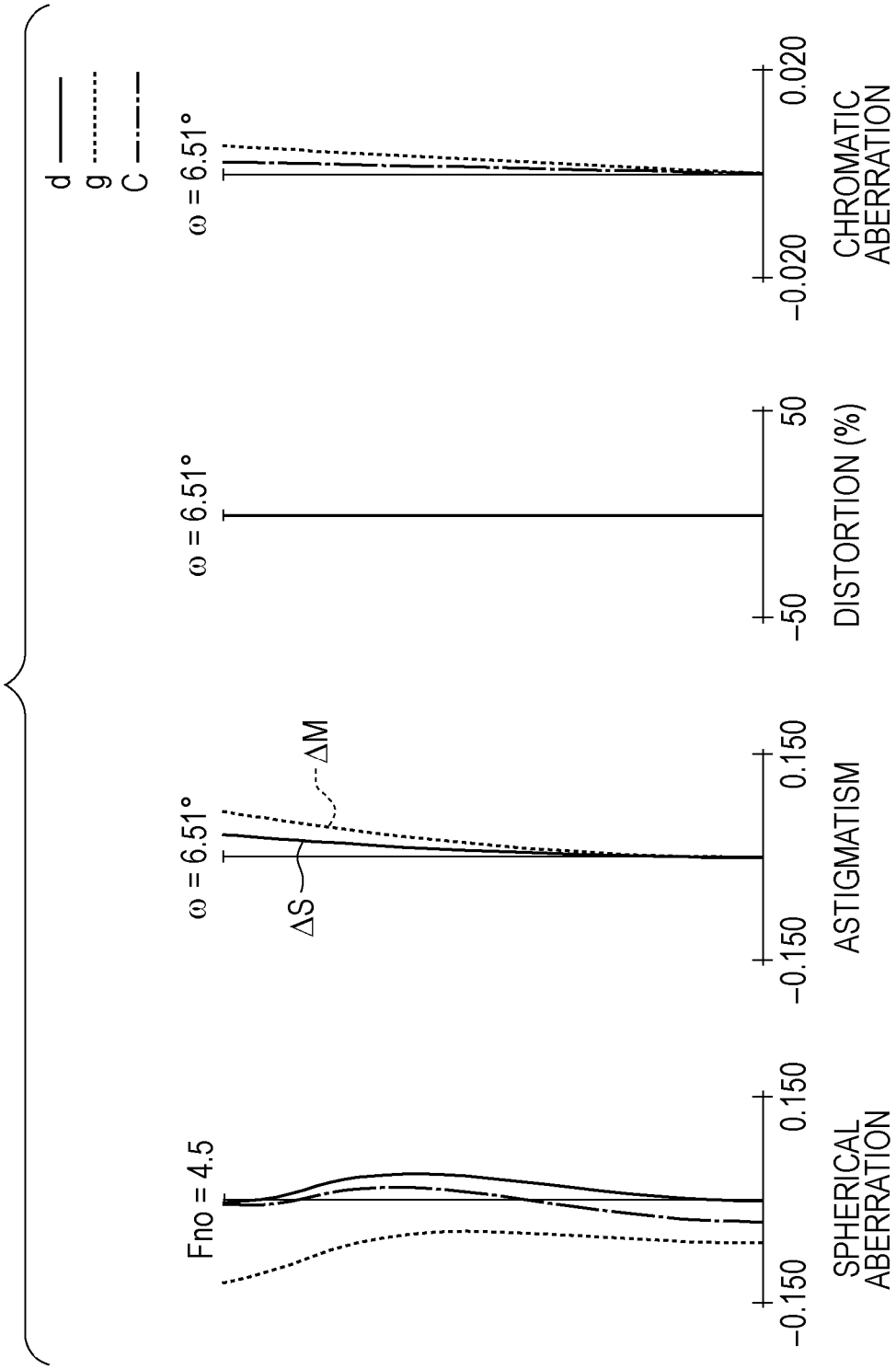

ZOOM LENS AND IMAGE PICKUP APPARATUS INCLUDING THE SAME

BACKGROUND OF THE INVENTION

Field of the Invention

The present invention relates to a zoom lens and an image pickup apparatus including the zoom lens. For example, the present invention is suitable for an image pickup apparatus, such as a digital still camera, a video camera, a monitoring camera, or a broadcasting camera, that includes an image pickup element or suitable for an image pickup apparatus, such as a camera in which a silver-halide photography film is used.

Description of the Related Art

In recent years, an image pickup apparatus, such as a monitoring camera or a video camera, that includes a solid-state image pickup element has had improved functionality, and the overall size of the apparatus has been reduced. There is a demand that a zoom lens used in such an apparatus be small and have good optical characteristics. There is also a demand for a zoom lens having a high zoom ratio in order to enable imaging of a broader range with a single image pickup apparatus.

In order to meet such demands, a zoom lens that includes lens units having positive, negative, and positive refractive powers that are arranged in order from an object side to an image side is known.

Japanese Patent Laid-Open No. 2005-55625 discloses a zoom lens that has achieved a higher power while reducing distortion aberration or astigmatism by disposing a negative lens having a high refractive power in a second lens unit on a side closest to the object side.

However, in the zoom lens disclosed in Japanese Patent Laid-Open No. 2005-55625, the magnification varying burden of a third lens unit is relatively small, and thus it is difficult to achieve a high power at a sufficient level.

SUMMARY OF THE INVENTION

The present invention provides a zoom lens including a first lens unit having a positive refractive power, a second lens unit having a negative refractive power, and a third lens unit having a positive refractive power that are arranged in order from an object side to an image side. A distance between adjacent ones of the first through third lens units changes when zooming. When zooming, the first lens unit is stationary. When zooming from a wide angle end to a telephoto end, the second lens unit is configured to move toward the image side and then to move toward the object side, and the third lens unit is configured to move toward the object side. When an amount of movement of the third lens unit when zooming from the wide angle end to the telephoto end is represented by M3 and a focal length of the third lens unit is represented by f3, a conditional expression $1.30 < M3/f3 < 3.00$ is satisfied.

Further features of the present invention will become apparent from the following description of exemplary embodiments (with reference to the attached drawings). Each of the embodiments of the present invention described below can be implemented solely or as a combination of a plurality of the embodiments or features thereof where necessary or where the combination of elements or features from individual embodiments in a single embodiment is beneficial.

BRIEF DESCRIPTION OF THE DRAWINGS

FIGS. 2A, 2B, and 2C are aberration diagrams, respectively, at a wide angle end, an intermediate zoom position, and a telephoto end of the zoom lens according to the first exemplary embodiment.

FIGS. 4A, 4B, and 4C are aberration diagrams, respectively, at a wide angle end, an intermediate zoom position, and a telephoto end of the zoom lens according to the second exemplary embodiment.

FIGS. 6A, 6B, and 6C are aberration diagrams, respectively, at a wide angle end, an intermediate zoom position, and a telephoto end of the zoom lens according to the third exemplary embodiment.

FIGS. 8A, 8B, and 8C are aberration diagrams, respectively, at a wide angle end, an intermediate zoom position, and a telephoto end of the zoom lens according to the fourth exemplary embodiment.

DESCRIPTION OF THE EMBODIMENTS

Hereinafter, a zoom lens and an image pickup apparatus including the zoom lens according to exemplary embodiments of the present invention will be described in detail with reference to the appended drawings. A zoom lens according to an exemplary embodiment of the present invention includes a first lens unit having a positive refractive power, a second lens unit having a negative refractive power, and a third lens unit having a positive refractive power, and the first through third lens units are arranged in order from an object side to an image side. Herein, a lens unit corresponds to a lens element that integrally moves when zooming. Each lens unit may include at least one lens and does not have to include a plurality of lenses.

Figure 1:
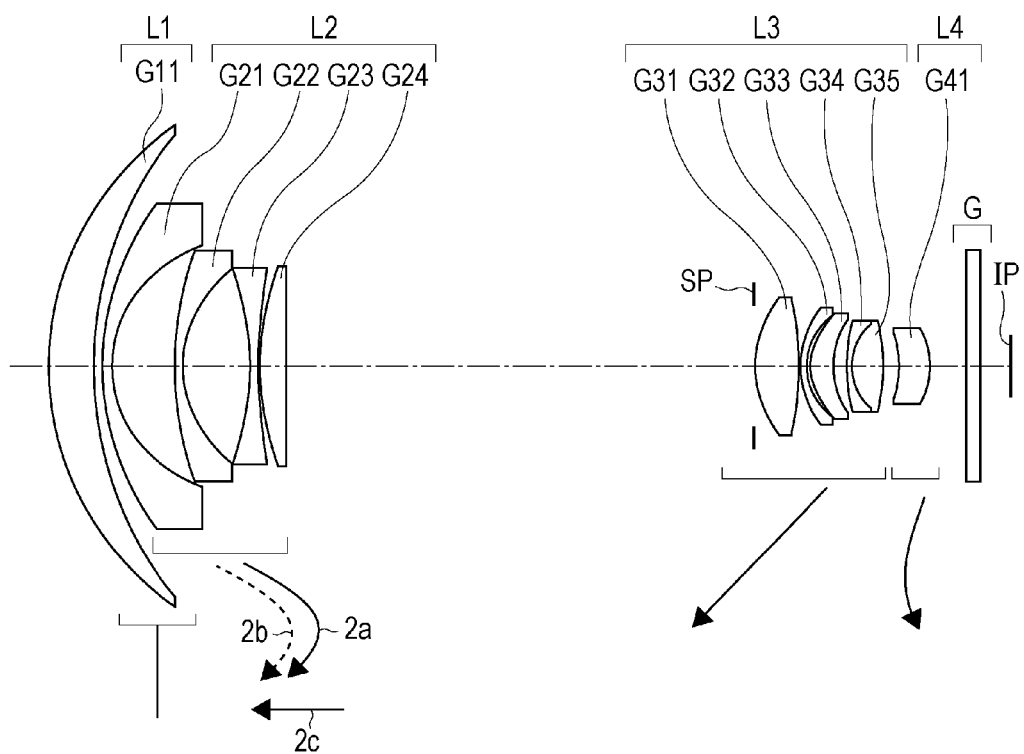
FIG. 1 is a lens sectional view at a wide angle end of a zoom lens according to a first exemplary embodiment.
Figure 3:
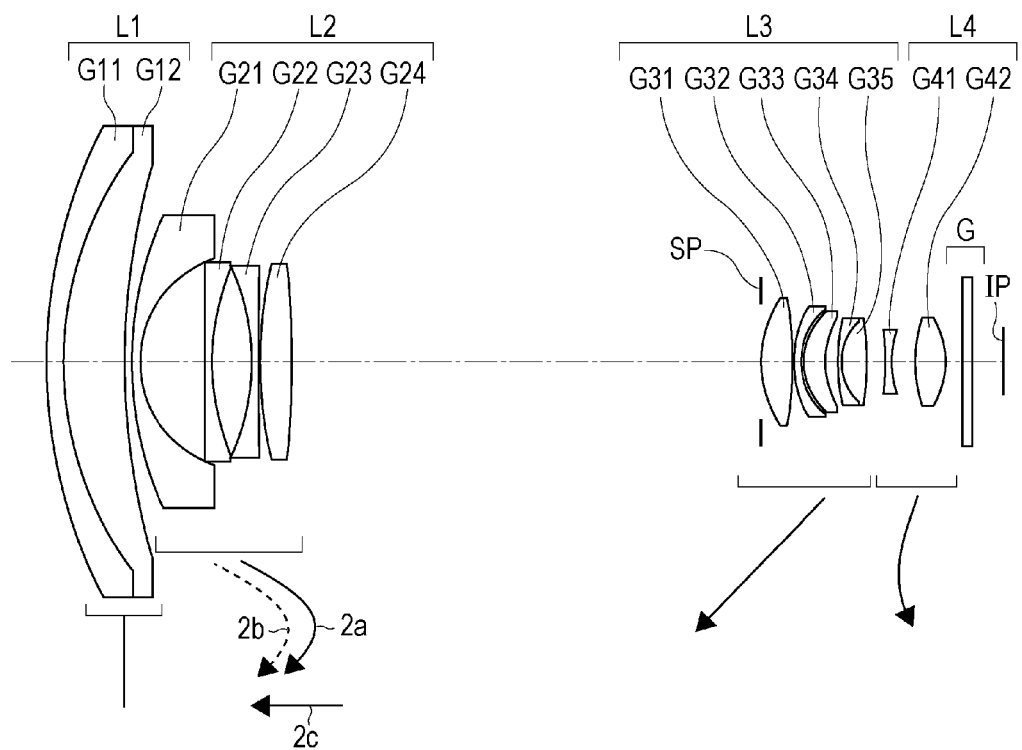
FIG. 3 is a lens sectional view at a wide angle end of a zoom lens according to a second exemplary embodiment.
Figure 4A:
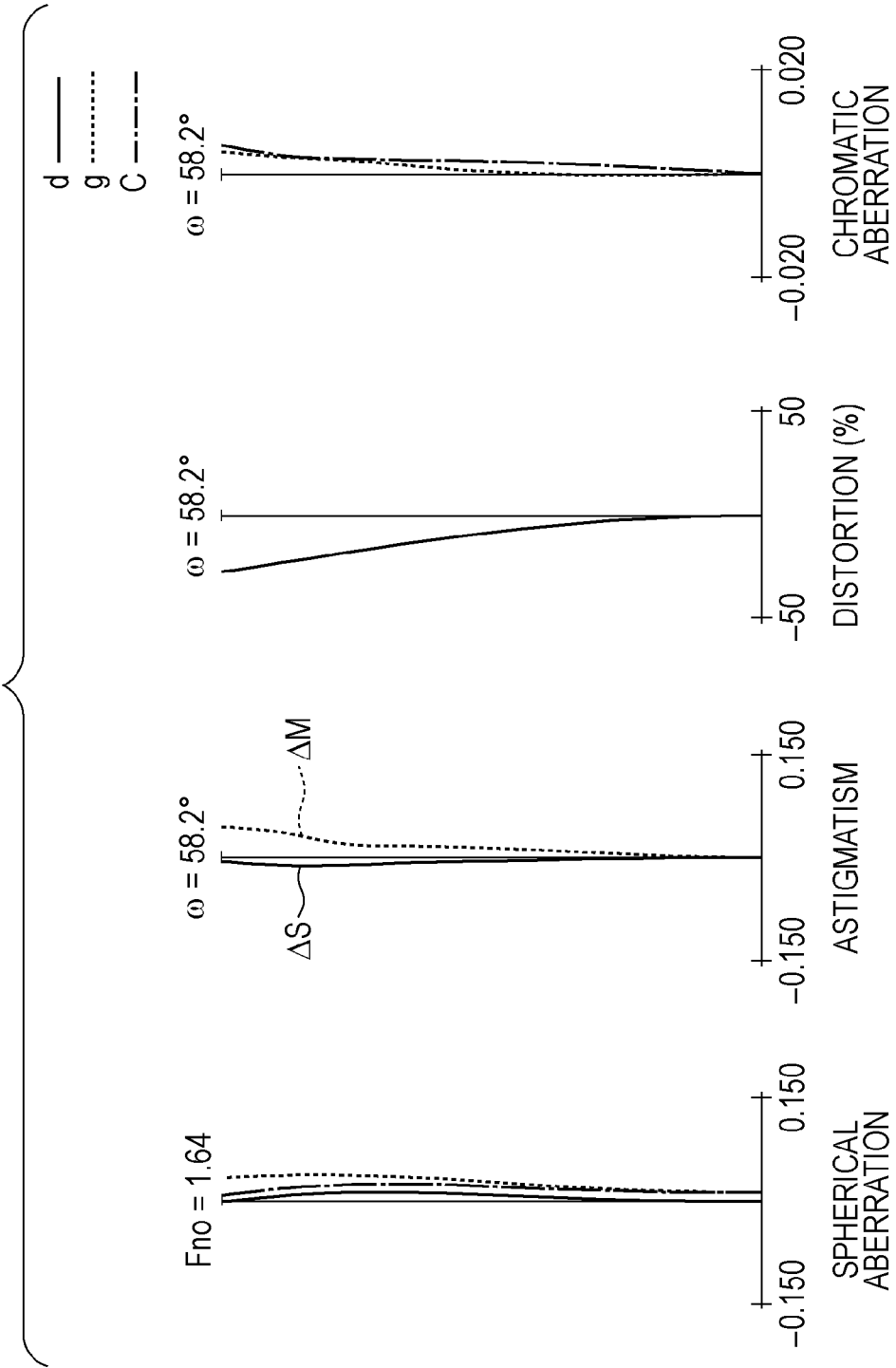

FIG. 1 is a lens sectional view at a wide angle end of a zoom lens according to a first exemplary embodiment. FIGS. 2A, 2B, and 2C are aberration diagrams, respectively, at a wide angle end, an intermediate zoom position, and a telephoto end of the zoom lens according to the first exemplary embodiment. The first exemplary embodiment provides a zoom lens having a zoom ratio of 7.7 and an F-number of approximately 1.44 to 3.99. FIG. 3 is a lens sectional view at a wide angle end of a zoom lens according to a second exemplary embodiment. FIGS. 4A, 4B, and 4C are aberration diagrams, respectively, at a wide angle end, an intermediate zoom position, and a telephoto end of the zoom lens according to the second exemplary embodiment. The second exemplary embodiment provides a zoom lens having a zoom ratio of 7.85 and an F-number of approximately 1.64 to 4.30.

Figure 5:
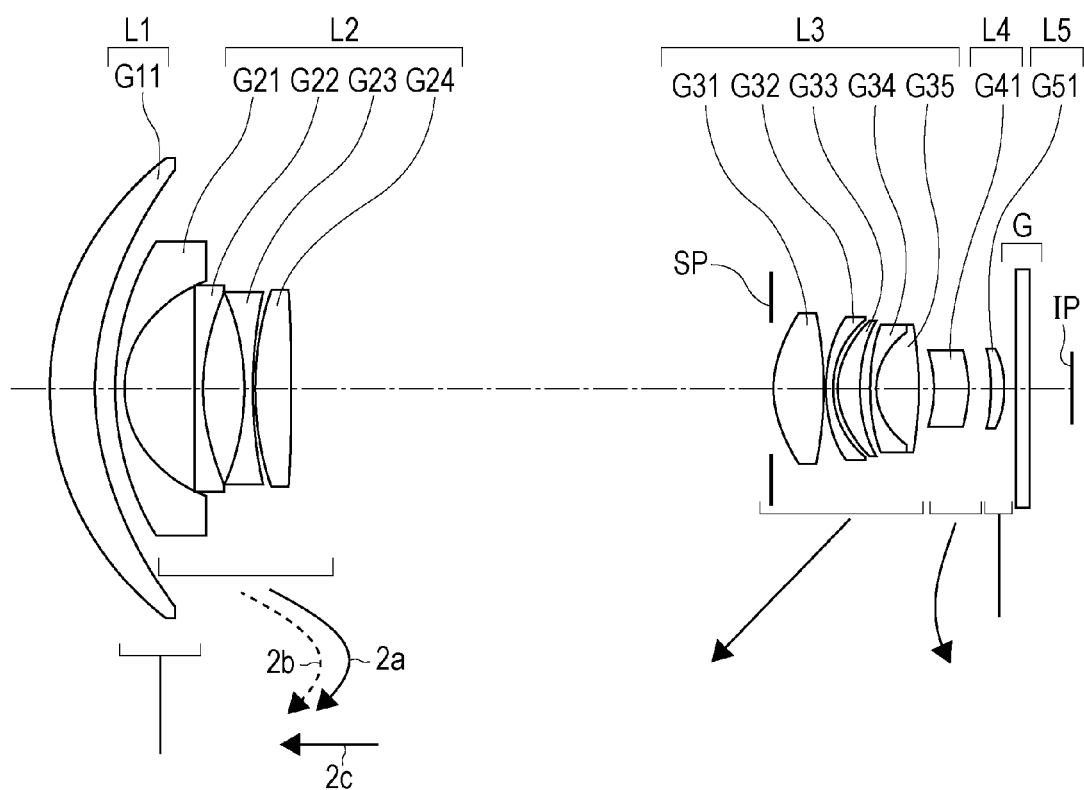
FIG. 5 is a lens sectional view at a wide angle end of a zoom lens according to a third exemplary embodiment.
Figure 7:
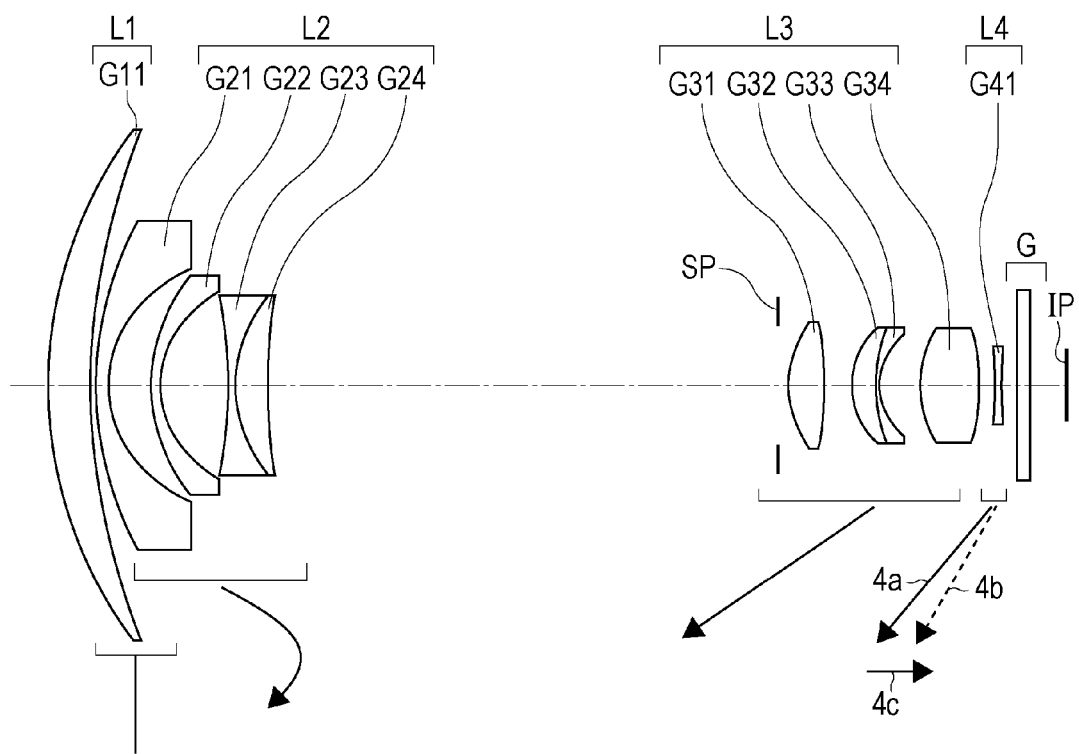
FIG. 7 is a lens sectional view at a wide angle end of a zoom lens according to a fourth exemplary embodiment.

FIG. 5 is a lens sectional view at a wide angle end of a zoom lens according to a third exemplary embodiment. FIGS. 6A, 6B, and 6C are aberration diagrams, respectively, at a wide angle end, an intermediate zoom position, and a telephoto end of the zoom lens according to the third exemplary embodiment. The third exemplary embodiment provides a zoom lens having a zoom ratio of 8.2 and an F-number of approximately 1.51 to 3.99. FIG. 7 is a lens sectional view at a wide angle end of a zoom lens according to a fourth exemplary embodiment. FIGS. 8A, 8B, and 8C are aberration diagrams, respectively, at a wide angle end, an intermediate zoom position, and a telephoto end of the zoom lens according to the fourth exemplary embodiment. The fourth exemplary embodiment provides a zoom lens having a zoom ratio of 9.6 and an F-number of approximately 1.65 to 4.50.

Figure 9:
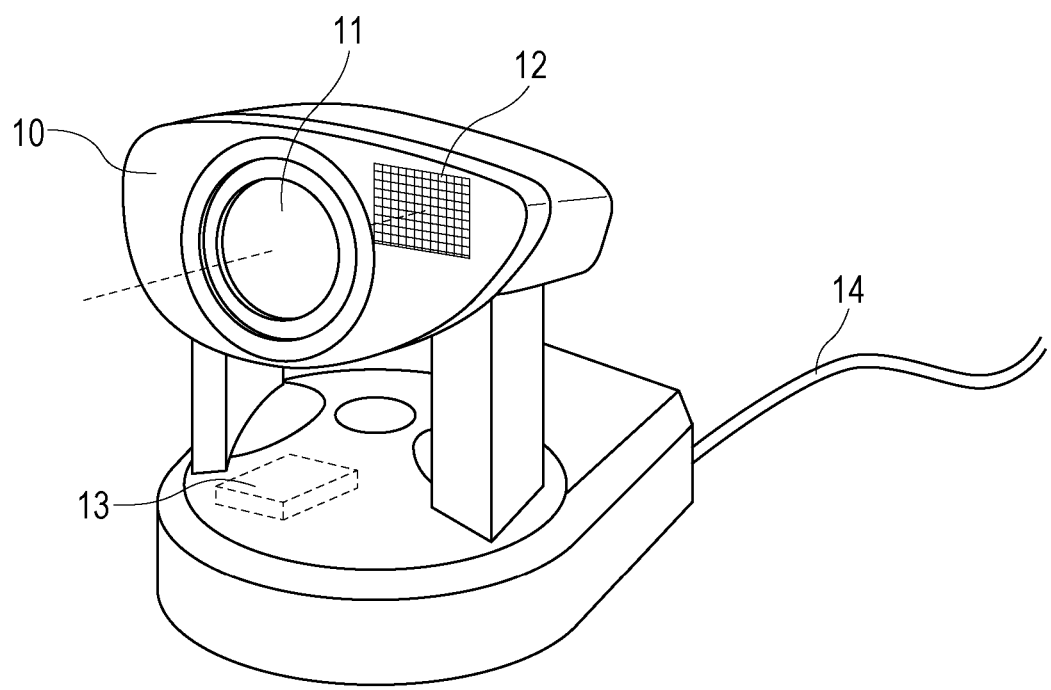
FIG. 9 is a schematic diagram of a primary portion of an image pickup apparatus according to an exemplary embodiment of the present invention.

FIG. 9 is a schematic diagram of a primary portion of a monitoring camera (image pickup apparatus) including a zoom lens according to an exemplary embodiment of the present invention. The zoom lens in each of the exemplary embodiments is an image pickup lens system to be used in an image pickup apparatus, such as a digital still camera, a video camera, a monitoring camera, or a broadcasting camera. In each lens sectional view, the left side corresponds to the object side, and the right side corresponds to the image side. In addition, in each lens sectional view, when i represents the order of a given lens unit counted from the object side to the image side, Li represents an ith lens unit.

The zoom lens according to the first and second exemplary embodiments consists of a first lens unit L1 having a positive refractive power, a second lens unit L2 having a negative refractive power, a third lens unit L3 having a positive refractive power, and a fourth lens unit L4 having a positive refractive power. The first and second exemplary embodiments provide a four-unit zoom lens of a positive lead type that consists of four lens units.

The zoom lens according to the third exemplary embodiment consists of a first lens unit L1 having a positive refractive power, a second lens unit L2 having a negative refractive power, a third lens unit L3 having a positive refractive power, a fourth lens unit L4 having a positive refractive power, and a fifth lens unit L5 having a positive refractive power. The third exemplary embodiment provides a five-unit zoom lens of a positive lead type that consists of five lens units.

The zoom lens according to the fourth exemplary embodiment consists of a first lens unit L1 having a positive refractive power, a second lens unit L2 having a negative refractive power, a third lens unit L3 having a positive refractive power, and a fourth lens unit L4 having a negative refractive power. The fourth exemplary embodiment provides a four-unit zoom lens of a positive lead type that consists of four lens units.

In each of the exemplary embodiments, the reference character SP denotes an aperture stop. In each of the exemplary embodiments, the aperture stop SP is disposed between the second lens unit L2 and the third lens unit L3. In each of the exemplary embodiments, the aperture stop SP moves along a trajectory identical to the trajectory of the third lens unit L3 when zooming. With this configuration, the structure of a lens barrel holding the zoom lens can be simplified.

The reference character G denotes an optical block corresponding to an optical filter, a face plate, a low pass filter, an infrared cut-off filter, or the like. The reference character IP denotes an image plane. When the zoom lens is used as an image pickup optical system of a video camera or a monitoring camera, the image plane IP corresponds to a solid-state image pickup element (photoelectric conversion element), such as a charge-coupled device (CCD) sensor or a complementary metal-oxide semiconductor (CMOS) sensor. When the zoom lens is used as an image pickup optical system of a silver-halide film camera, the image plane IP corresponds to the film surface.

In the aberration diagrams, Fno corresponds to the F-number, and spherical aberrations with respect to the C line (wavelength of 656.3 nm), the d line (wavelength of 587.6 nm), and the g line (wavelength of 435.8 nm) are indicated. In the aberration diagrams, ΔS represents a sagittal image plane, and ΔM represents a meridional image plane. The distortion aberration is indicated for the d line. In the chromatic aberration diagram, the chromatic aberrations for the C line and the g line are indicated. The symbol ω corresponds to an image pickup half angle of view.

In each of the exemplary embodiments, the lens units move as indicated by the arrows in the lens sectional view when zooming from the wide angle end to the telephoto end, and the distance between the adjacent lens units changes. Specifically, in each of the exemplary embodiments, the first lens unit L1 is stationary when zooming from the wide angle end to the telephoto end. The second lens unit L2 moves toward the image side and then moves to the object side when zooming from the wide angle end to the telephoto end. The third lens unit L3 monotonically moves toward the object side.

In the zoom lens according to the first through third exemplary embodiments, the fourth lens unit L4 moves so as to be located closer to the image side at the telephoto end than at the wide angle end. In the zoom lens according to the fourth exemplary embodiment, the fourth lens unit L4 monotonically moves toward the object side. In addition, in the zoom lens according to the third exemplary embodiment, the fifth lens unit L5 is stationary when zooming.

Hereinafter, the zoom position at which the second lens unit L2 is located closest to the image side when zooming from the wide angle end to the telephoto end is referred to as an intermediate zoom position. In the zoom lens in each of the exemplary embodiments, the distance between the first lens unit L1 and the second lens unit L2 is greater at the telephoto end than at the wide angle end, and the distance between the second lens unit L2 and the third lens unit L3 is smaller at the telephoto end than at the wide angle end. With this configuration, the power of the zoom lens can be increased efficiently. In addition, the distance between the third lens unit L3 and the fourth lens unit L4 is greater at the telephoto end than at the wide angle end. In the zoom lens according to the third exemplary embodiment, the distance between the fourth lens unit L4 and the fifth lens unit L5 is smaller at the telephoto end than at the wide angle end.

In addition, in the zoom lens in each of the exemplary embodiments, the distance between the first lens unit L1 and the second lens unit L2 is greater at the intermediate zoom position than at the wide angle end, the distance between the second lens unit L2 and the third lens unit L3 is smaller at the intermediate zoom position than at the wide angle end, and the distance between the third lens unit L3 and the fourth lens unit L4 is greater at the intermediate zoom position than at the wide angle end. Furthermore, the distance between the first lens unit L1 and the second lens unit L2 is smaller at the telephoto end than at the intermediate zoom position, the distance between the second lens unit L2 and the third lens unit L3 is greater at the telephoto end than at the intermediate zoom position, and the distance between the third lens unit L3 and the fourth lens unit L4 is greater at the telephoto end than at the intermediate zoom position.

In the zoom lens in each of the exemplary embodiments, in order to increase the magnification varying burden of the third lens unit L3, the refractive power of the third lens unit L3 is increased, and the amount of movement of the third lens unit L3 when zooming is increased. The amount of movement of the third lens unit L3 is increased by monotonically moving the third lens unit L3 toward the object side when zooming from the wide angle end to the telephoto end.

In the meantime, the second lens unit L2 contributes to the magnification variation by moving toward the image side when zooming from the wide angle end to the intermediate zoom position. In order to prevent interference of the second lens unit L2 and the third lens unit L3, the second lens unit L2 moves toward the object side when zooming from the intermediate zoom position to the telephoto end. In this manner, the second lens unit L2 is moved toward the image side and then moved toward the object side when zooming from the wide angle end to the telephoto end. Thus, the size of the zoom lens is reduced, and the power of the zoom lens is increased.

In addition, in the zoom lens according to the first to third exemplary embodiments, the second lens unit L2 serves as a focusing unit. When the zoom lens is focused from an object at infinity to an object at close range at the telephoto end, the second lens unit L2 is let out toward the object side as indicated by the arrow 2c in the lens sectional view. The solid line 2a and the dotted line 2b in the lens sectional view indicate the movement loci for correcting a variation of the image plane associated with zooming from the wide angle end to the telephoto end when the object at infinity and the object at close range, respectively, are brought into focus.

In the zoom lens according to the fourth exemplary embodiment, the fourth lens unit L4 serves as a focusing unit. When the zoom lens is focused from an object at infinity to an object at close range at the telephoto end, the fourth lens unit L4 is moved toward the image side as indicated by the arrow 4c in the lens sectional view. The solid line 4a and the dotted line 4b in the lens sectional view indicate the movement loci for correcting a variation of the image plane associated with zooming from the wide angle end to the telephoto end when the object at infinity and the object at close range, respectively, are brought into focus.

In addition, in the zoom lens according to each of the exemplary embodiments, a given lens unit or a given lens is moved so as to have a component in a direction perpendicular to the optical axis, and thus an image blur can be corrected.

In each of the exemplary embodiments, the amount of movement of the third lens unit L3 when zooming from the wide angle end to the telephoto end is represented by M3, and the focal length of the third lens unit L3 is represented by f3. Then, the following conditional expression (1) is satisfied.

$$1.30 < M3/f3 < 3.00 \quad (1)$$

Herein, the amount of movement is a difference in the position along the optical axis of each lens unit at between the wide angle end and the telephoto end, and the sign of the amount of movement is positive when a given lens unit is located closer to the object side at the telephoto end than at the wide angle end or is negative when a given lens unit is located closer to the image side at the telephoto end than at the wide angle end.

The conditional expression (1) defines the ratio between the amount of movement M3 of the third lens unit L3 and the focal length f3 of the third lens unit L3. When the focal length f3 of the third lens unit L3 is reduced so that the ratio exceeds the upper limit value of the conditional expression (1), the refractive power of the third lens unit L3 becomes too high. As a result, a large amount of spherical aberration occurs, and this is not preferable. Meanwhile, when the amount of movement M3 of the third lens unit L3 is increased so that the ratio exceeds the upper limit value of the conditional expression (1), the size of the zoom lens is increased, and this is not preferable.

When the amount of movement M3 of the third lens unit L3 is reduced so that the ratio falls below the lower limit value of the conditional expression (1), the magnification varying burden of the third lens unit L3 is reduced. As a result, it becomes difficult to achieve a zoom lens having a wide angle of view and a high power, and this is not preferable.

As described thus far, in each of the exemplary embodiments, the components are configured as appropriate so as to satisfy the conditional expression (1). With this configuration, a zoom ratio that is small in size, has a high zoom ratio, and has high optical performance can be obtained.

It is to be noted that, in each of the exemplary embodiments, preferably, the numerical range of the conditional expression (1) is set as follows.

$$1.31 < M3/f3 < 2.50 \quad (1a)$$

More preferably, the numerical range of the conditional expression (1) is set as follows.

$$1.32 < M3/f3 < 2.20 \quad (1b)$$

Furthermore, in each of the exemplary embodiments, it is more preferable that one or more of the following conditional expressions be satisfied.

$$0.10 < M2mt/f2 < 2.00 \quad (2)$$

$$1.84 < Nd2p < 2.30 \quad (3)$$

$$5.0 < vd2p < 25.0 \quad (4)$$

$$-35.0 < f1/f2 < -8.0 \quad (5)$$

$$-8.00 < f2/fw < -0.80 \quad (6)$$

$$0.70 < TL1G/fw < 4.00 \quad (7)$$

$$0.70 < f31/f3 < 1.80 \quad (8)$$

$$28.0 < v3p - v3n < 65.0 \quad (9)$$

$$0.02 < |f3/f4| < 0.95 \quad (10)$$

Here, the amount of movement of the second lens unit L2 when zooming from the intermediate zoom position to the telephoto end is represented by M2mt, the focal length of the first lens unit L1 is represented by f1, the focal length of the second lens unit L2 is represented by f2, and the focal length of the fourth lens unit L4 is represented by f4. Furthermore, the refractive index of the material of a positive lens included in the second lens unit L2 on the d line is represented by Nd2p, the Abbe number thereof is represented by vd2p, the focal length of the zoom lens at the wide angle end is represented by fw, and the total thickness, along the optical axis, of the lens(es) included in the first lens unit L1 is represented by TL1G. In addition, the focal length of the positive lens disposed closest to the object side in the third lens unit L3 is represented by f31. The Abbe number of the material of a positive lens constituting a cemented lens component included in the third lens unit L3 is represented by v3p, and the Abbe number of the material of a negative lens constituting the cemented lens component included in the third lens unit L3 is represented by v3n.

Here, the Abbe number vd is a numerical value expressed by vd=(Nd−1)/(NF−NC), in which the refractive indices of the materials with respect to the F line (486.1 nm), the C line (656.3 nm), and the d line (587.6 nm) are represented by NF, NC, and Nd, respectively.

The conditional expression (2) defines the ratio between the amount of movement M2mt of the second lens unit L2 when zooming from the intermediate zoom position to the telephoto end and the focal length f2 of the second lens unit L2. When the focal length f2 of the second lens unit L2 is reduced so that the ratio exceeds the upper limit value of the conditional expression (2), the refractive power of the second lens unit L2 becomes too high. As a result, a large amount of curvature of field or chromatic aberration occurs in the entire zoom range, and this is not preferable. When the focal length f2 of the second lens unit L2 is increased so that the ratio falls below the lower limit value of the conditional expression (2), the refractive power of the second lens unit L2 becomes too low. Meanwhile, when the ratio falls below the lower limit value of the conditional expression (2), the amount of movement M2mt becomes too small. As a result, the magnification varying burden of the second lens unit L2 is reduced, which makes it difficult to achieve a zoom lens having a high power, and this is not preferable.

The conditional expressions (3) and (4) define the material of a positive lens included in the second lens unit L2. When the refractive index Nd2p of the material of the positive lens included in the second lens unit L2 becomes too high so as to exceed the upper limit value of the conditional expression (3), existing materials that satisfy the numerical range of the conditional expression (4) become limited, and this is not preferable. When the refractive index Nd2p of the material of the positive lens included in the second lens unit L2 becomes too low so as to fall below the lower limit value of the conditional expression (3), a large amount of spherical aberration occurs at the telephoto end, and this is not preferable.

When the Abbe number vd2p of the material of the positive lens included in the second lens unit L2 becomes large so as to exceed the upper limit value of the conditional expression (4), it becomes difficult to favorably correct the magnification chromatic aberration that occurs in the second lens unit L2, and this is not preferable. When the Abbe number vd2p of the material of the positive lens included in the second lens unit L2 becomes small so as to fall below the lower limit value of the conditional expression (4), existing materials that satisfy the numerical range of the conditional expression (3) become limited, and this is not preferable.

The conditional expression (5) defines the ratio between the focal length f1 of the first lens unit L1 and the focal length f2 of the second lens unit L2. When the focal length f1 of the first lens unit L1 is reduced so that the ratio exceeds the upper limit value of the conditional expression (5), the refractive power of the first lens unit L1 becomes too high. As a result, a large amount of magnification chromatic aberration occurs, and this is not preferable. When the focal length f1 of the first lens unit L1 is increased so that the ratio falls below the lower limit value of the conditional expression (5), the refractive power of the first lens unit L1 becomes too small. As a result, the effective diameter of the first lens unit L1 increases, and this is not preferable.

The conditional expression (6) defines the ratio between the focal length f2 of the second lens unit L2 and the focal length fw of the zoom lens at the wide angle end. When the focal length f2 of the second lens unit L2 is reduced so that the ratio exceeds the upper limit value of the conditional expression (6), the refractive power of the second lens unit L2 becomes too high. As a result, a large amount of curvature of field or chromatic aberration occurs in the entire zoom range, and this is not preferable. When the focal length f2 of the second lens unit L2 is increased so that the ratio falls below the lower limit value of the conditional expression (6), the refractive power of the second lens unit L2 becomes too low. As a result, it becomes difficult to achieve a zoom lens having a wide angle of view. Furthermore, the effective diameter of the first lens unit L1 increases, and this is not preferable.

The conditional expression (7) defines the ratio between the total thickness TL1G, along the optical axis, of the lens(es) included in the first lens unit L1 and the focal length fw of the zoom lens at the wide angle end. When the total thickness TL1G, along the optical axis, of the lens(es) included in the first lens unit L1 is increased so that the ratio exceeds the upper limit value of the conditional expression (7), the first lens unit L1 becomes long in the optical axis direction, which increases the total lens length, and this is not preferable. When the total thickness TL1G, along the optical axis, of the lens(es) included in the first lens unit L1 is reduced so that the ratio falls below the lower limit value of the conditional expression (7), the refractive power of each lens included in the first lens unit L1 needs to be increased in order to retain the positive refractive power of the first lens unit L1. As a result, a large amount of spherical aberration occurs, and this is not preferable.

The conditional expression (8) defines the ratio between the focal length f31 of a positive lens G31 disposed closest to the object side in the third lens unit L3 and the focal length f3 of the third lens unit L3. When the focal length f31 of the positive lens G31 disposed closest to the object side in the third lens unit L3 is increased so that the ratio exceeds the upper limit value of the conditional expression (8), the refractive power of the positive lens G31 becomes too low. As a result, it becomes difficult to correct spherical aberration at a sufficient level, and this is not preferable. When the focal length f31 of the positive lens G31 disposed closest to the object side in the third lens unit L3 is reduced so that the ratio falls below the lower limit value of the conditional expression (8), the refractive power of the positive lens G31 becomes too high. As a result, spherical aberration is overcorrected, and this is not preferable.

The conditional expression (9) defines the relation between the Abbe number v3p of the material of a positive lens constituting a cemented lens component included in the third lens unit L3 and the Abbe number v3n of the material of a negative lens constituting the cemented lens component included in the third lens unit L3. When the relation exceeds the upper limit value of the conditional expression (9), on-axis chromatic aberration is overcorrected, and this is not preferable. When the relation falls below the lower limit value of the conditional expression (9), it becomes difficult to correct on-axis chromatic aberration at a sufficient level, and this is not preferable.

The conditional expression (10) defines the ratio between the focal length f3 of the third lens unit L3 and the focal length f4 of the fourth lens unit L4. When the focal length f3 of the third lens unit L3 is increased so that the ratio exceeds the upper limit value of the conditional expression (10), the refractive power of the third lens unit L3 becomes too low. As a result, the magnification varying burden of the third lens unit L3 becomes small, which makes it difficult to achieve a zoom lens having a high power, and this is not preferable. When the focal length f3 of the third lens unit L3 is reduced so that the ratio falls below the lower limit value of the conditional expression (10), the refractive power of the third lens unit L3 becomes too high. As a result, a large amount of spherical aberration or coma aberration occurs, and this is not preferable.

Preferably, the numerical ranges of the conditional expressions (2) through (10) are set as follows.

$$0.20<M2mt/f2<1.50 \qquad (2a)$$
$$1.87<Nd2p<2.10 \qquad (3a)$$
$$10.0<vd2p<21.0 \qquad (4a)$$
$$-28.0<f1/f2<-10.0 \qquad (5a)$$
$$-5.00<f2/fw<-2.00 \qquad (6a)$$
$$0.90<TL1G/fw<3.00 \qquad (7a)$$
$$0.90<f31/f3<1.50 \qquad (8a)$$
$$38.0<v3p-v3n<60.0 \qquad (9a)$$
$$0.03<|f3/f4|<0.85 \qquad (10a)$$

More preferably, the numerical ranges of the conditional expressions (2) through (10) are set as follows.

$$0.25<M2mt/f2<1.35 \qquad (2b)$$
$$1.90<Nd2p<2.00 \qquad (3b)$$
$$15.0<vd2p<19.0 \qquad (4b)$$
$$-25.0<f1/f2<-14.0 \qquad (5b)$$
$$-3.50<f2/fw<-2.50 \qquad (6b)$$
$$1.00<TL1G/fw<2.70 \qquad (7b)$$
$$1.00<f31/f3<1.25 \qquad (8b)$$
$$48.0<v3p-v3n<55.0 \qquad (9b)$$
$$0.04<|f3/f4|<0.70 \qquad (10b)$$

Furthermore, when a zoom lens according to an exemplary embodiment of the present invention is applied to an image pickup apparatus including an image pickup element that receives an image formed by the zoom lens, it is preferable that the following conditional expression (11) be satisfied.

$$0.50<(\tan \omega W/\tan \omega T)/(\beta 3t/\beta 3w)<1.70 \qquad (11)$$

In the above, $\omega W$ represents the half angle of view at the wide angle end, $\omega T$ represents the half angle of view at the telephoto end, $\beta 3w$ represents the lateral magnification of the third lens unit L3 at the wide angle end, and $\beta 3t$ represents the lateral magnification of the third lens unit L3 at the telephoto end.

When the half angle of view $\omega W$ at the wide angle end is increased so that the ratio exceeds the upper limit value of the conditional expression (11), a large amount of distortion aberration occurs at the wide angle end, and this is not preferable. When the ratio falls below the lower limit value of the conditional expression (11), the amount of change in the focal length when zooming from the wide angle end to the telephoto end is reduced, which makes it difficult to achieve a zoom lens having a high power, and this is not preferable.

In each of the exemplary embodiments, preferably, the numerical range of the conditional expression (11) is set as follows.

$$0.60<(\tan \omega W/\tan \omega T)/(\beta 3t/\beta 3w)<1.50 \qquad (11a)$$

More preferably, the numerical range of the conditional expression (11) is set as follows.

$$0.70<(\tan \omega W/\tan \omega T)/(\beta 3t/\beta 3w)<1.30 \qquad (11b)$$

Next, the configuration of each lens unit will be described. In the zoom lens according to the first, third, and fourth exemplary embodiments, the first lens unit L1 consists of a positive lens G11 having a meniscus shape that projects toward the object side. As the positive lens G11 has a meniscus shape, an off-axis light beam can be refracted gently, and spherical aberration that occurs in the first lens unit L1 can be reduced.

In the zoom lens according to the second exemplary embodiment, the first lens unit L1 consists of a cemented lens component in which a negative lens G11 and a positive lens G12 are cemented. The negative lens G11 is a lens having a meniscus shape that projects toward the object side, and the positive lens G12 is a lens having a meniscus shape that projects toward the object side. As the positive lens and the negative lens are disposed in the first lens unit L1, chromatic aberration is corrected favorably in the first lens unit L1. In addition, when the negative lens G11 and the positive lens G12 are seen as a single lens element, that lens element can be considered as having a meniscus shape that, as a whole, projects toward the object side. As the first lens unit L1 consists of a lens element having a meniscus shape that, as a whole, projects toward the object side, an off-axis light beam can be refracted gently, and spherical aberration that occurs in the first lens unit L1 can be reduced.

In addition, in the zoom lens according to each of the exemplary embodiments, the second lens unit L2 consists of a negative lens G21, a negative lens G22, a negative lens G23, and a positive lens G24 that are arranged in order from the object side to the image side. As three or more negative lenses are disposed in the second lens unit L2, the negative refractive power can be divided thereamong, and an occurrence of astigmatism or curvature of field can be suppressed.

In the zoom lens according to the first and fourth exemplary embodiments, the negative lens G21 is a negative lens having a meniscus shape that projects toward the object side, and the negative lens G22 is a negative lens having a meniscus shape that projects toward the object side. In addition, the negative lens G23 is a negative lens having a biconcave shape, and the positive lens G24 is a positive lens having a meniscus shape that projects toward the object side. In the zoom lens according to the second exemplary embodiment, the negative lens G21 is a negative lens having a meniscus shape that projects toward the object side, and the negative lens G22 is a negative lens having a biconcave shape. In addition, the negative lens G23 is a negative lens having a biconcave shape, and the positive lens G24 is a positive lens having a biconvex shape. In the zoom lens according to the third exemplary embodiment, the negative lens G21 is a negative lens having a meniscus shape that projects toward the object side, and the negative lens G22 is a negative lens having a meniscus shape that projects toward the object side. In addition, the negative lens G23 is a negative lens having a biconcave shape, and the positive lens G24 is a positive lens having a biconvex shape.

In the zoom lens according to the first through third exemplary embodiments, the third lens unit L3 consists of a positive lens G31, a negative lens G32, a positive lens G33, a negative lens G34, and a positive lens G35 that are arranged in order from the object side to the image side. In the zoom lens according to the fourth exemplary embodiment, the third lens unit L3 consists of a positive lens G31, a positive lens G32, a negative lens G33, and a positive lens G34 that are arranged in order from the object side to the image side. In the first through third exemplary embodiments, the negative lens G34 and the positive lens G35 are cemented. In the fourth exemplary embodiment, the positive lens G32 and the negative lens G33 are cemented. In the zoom lens according to the first through third exemplary embodiments, by disposing two or more positive lenses and two or more negative lenses in the third lens unit L3, chromatic aberration can be corrected favorably in the third lens unit L3.

In the zoom lens according to the first through third exemplary embodiments, the positive lens G31 is a positive lens having a biconvex shape, the negative lens G32 is a negative lens having a meniscus shape that projects toward the object side, and the positive lens G33 is a positive lens having a meniscus shape that projects toward the object side. The negative lens G34 is a negative lens having a meniscus shape that projects toward the object side, and the positive lens G35 is a positive lens having a biconvex shape. In the zoom lens according to the fourth exemplary embodiment, the positive lens G31 is a positive lens having a biconvex shape, the positive lens G32 is a positive lens having a meniscus shape that projects toward the object side, and the negative lens G33 is a negative lens having a meniscus shape that projects toward the object side. In addition, the positive lens G34 is a positive lens having a biconvex shape.

In the zoom lens according to the first and third exemplary embodiments, the fourth lens unit L4 consists of a positive lens G42 having a meniscus shape that projects toward the image side. In the zoom lens according to the second exemplary embodiment, the fourth lens unit L4 consists of a negative lens G41 having a biconcave shape and a positive lens G42 having a biconvex shape that are arranged in order from the object side to the image side. In the zoom lens according to the fourth exemplary embodiment, the fourth lens unit L4 consists of a negative lens G41 having a biconcave shape.

In the zoom lens according to the third exemplary embodiment, the fifth lens unit L5 consists of a positive lens G51 having a meniscus shape that projects toward the image side.

Next, lens data of first through fourth numerical examples corresponding, respectively, to the first through fourth exemplary embodiments of the present invention will be presented. In each of the numerical examples, i represents the order of a given optical surface counted from the object side. In addition, ri represents the radius of curvature of an ith optical surface (ith surface), di represents the distance between an ith surface and an i+1th surface, ndi and vdi represent the refractive index and the Abbe number, respectively, of the material of an ith optical member with respect to the d line.

Furthermore, when K represents the eccentricity, A4, A6, A8, and A10 represent aspherical coefficients, and the displacement in the optical axis direction at the position of a height h from the optical axis is represented by x with the surface vertex serving as a reference, the aspherical shape is expressed by $x=(h^2/r)/\{1+[1-(1+K)(h/r)^2]^{1/2}\}+A4h^4+A6h^6+A8h^8+A10h^{10}$.

Here, r is the radius of paraxial curvature. In addition, the expression e-Z means $10^{-Z}$.

In each of the exemplary embodiments, the back focus (BF) is the distance from a surface closest to the image side in a lens system to the image side expressed in terms of the air-equivalent length. In addition, the correspondence between the numerical examples and the conditional expressions described above is indicated in Table 1.

It is to be noted that the effective image diameter (diameter of an image circle) at the wide angle end can be made smaller than the effective image diameter at the telephoto end. This is because the barrel distortion aberration that is likely to occur at the wide angle side can be corrected by enlarging an image through image processing.

First Numerical Example

| unit: mm | | | | |
|---|---|---|---|---|
| surface data | | | | |
| surface number | r | d | nd | vd |
| 1 | 26.749 | 3.90 | 1.63854 | 55.4 |
| 2 | 33.767 | (variable) | | |
| 3 | 24.714 | 0.90 | 2.00100 | 29.1 |
| 4 | 11.533 | 5.54 | | |
| 5 | 32.064 | 0.70 | 1.88300 | 40.8 |
| 6 | 11.142 | 5.95 | | |
| 7 | −20.869 | 0.70 | 1.49700 | 81.5 |
| 8 | 53.368 | 0.15 | | |
| 9 | 27.321 | 2.25 | 1.95906 | 17.5 |
| 10 | 578.026 | (variable) | | |
| 11 (aperture stop) | ∞ | 0.15 | | |
| 12* | 9.995 | 3.89 | 1.49710 | 81.6 |
| 13* | −27.095 | 0.15 | | |
| 14 | 9.127 | 0.50 | 1.69895 | 30.1 |
| 15 | 6.391 | 0.38 | | |
| 16 | 6.58 | 2.02 | 1.91082 | 35.3 |
| 17 | 8.358 | 1.16 | | |
| 18 | 17.803 | 0.45 | 2.00100 | 29.1 |
| 19 | 5.574 | 2.79 | 1.49700 | 81.5 |
| 20 | −24.123 | (variable) | | |
| 21* | −9.858 | 2.70 | 1.85135 | 40.1 |
| 22* | −8.589 | (variable) | | |
| 23 | ∞ | 1.20 | 1.51633 | 64.1 |
| image plane | ∞ | | | |

| aspherical surface data |
|---|
| 12th surface |

K = 0.00000e+000    A4 = −6.67470e−005    A6 = −1.10112e−006
A8 = 2.62703e−008    A10 = −4.90138e−010

13th surface

K = 0.00000e+000    A4 = 1.21543e−004    A6 = −8.85126e−007
A8 = 2.27660e−008    A10 = −3.99041e−010

21st surface

K = 0.00000e+000    A4 = −1.66928e−004    A6 = 7.24031e−006
A8 = −2.20615e−007    A10 = 1.04619e−008

22nd surface

K = 0.00000e+000    A4 = 9.89242e−005    A6 = 3.96707e−006
A8 = −8.34099e−008    A10 = 3.58727e−009

| various pieces of data | | | |
|---|---|---|---|
| zoom ratio 7.7 | | | |
| | wide angle | intermediate zoom position | telephoto |
| focal length | 2.95 | 12.41 | 22.72 |
| F-number | 1.44 | 2.52 | 3.99 |
| half angle of view | 59.0 | 14.4 | 7.97 |
| image height | 3.2 | 3.2 | 3.2 |
| total lens length | 77.74 | 84.54 | 79.50 |
| BF (in air) | 6.80 | 7.39 | 5.04 |
| distance | | | |
| d2 | 0.80 | 25.56 | 20.82 |
| d10 | 41.2 | 7.01 | 1.10 |

-continued unit: mm

| | | | |
|---|---|---|---|
| d20 | 1.45 | 10.29 | 23.29 |
| d22 | 3.20 | 3.80 | 1.44 | lens unit data

| unit | focal length |
|---|---|
| 1 | 165.7 |
| 2 | −9.5 |
| 3 | 13.4 |
| 4 | 39.6 |

Second Numerical Example unit: mm surface data

| surface number | r | d | nd | vd |
|---|---|---|---|---|
| 1 | 64.29 | 2.10 | 1.80000 | 29.8 |
| 2 | 43.979 | 7.80 | 1.80400 | 46.6 |
| 3 | 90.581 | (variable) | | |
| 4 | 43.771 | 1.10 | 2.00100 | 29.1 |
| 5 | 13.355 | 8.28 | | |
| 6 | −2025.1 | 0.80 | 1.88300 | 40.8 |
| 7 | 29.738 | 5.04 | | |
| 8 | −26.155 | 0.80 | 1.49700 | 81.5 |
| 9 | 359.884 | 0.15 | | |
| 10 | 50.367 | 4.00 | 1.95906 | 17.5 |
| 11 | −140.422 | (variable) | | |
| 12 (aperture stop) | ∞ | 0.15 | | |
| 13* | 13.834 | 3.92 | 1.55332 | 71.7 |
| 14* | −35.672 | 0.15 | | |
| 15 | 13.089 | 0.95 | 1.73800 | 32.3 |
| 16 | 8.331 | 0.36 | | |
| 17 | 8.414 | 2.76 | 1.91082 | 35.3 |
| 18 | 11.769 | 1.55 | | |
| 19 | 27.387 | 0.45 | 2.00100 | 29.1 |
| 20 | 7.109 | 3.19 | 1.49700 | 81.5 |
| 21 | −31.899 | (variable) | | |
| 22 | −25.535 | 0.75 | 1.53996 | 59.5 |
| 23 | 10.393 | 2.92 | | |
| 24* | 14.732 | 3.90 | 1.49710 | 81.6 |
| 25* | −9.657 | (variable) | | |
| 26 | ∞ | 1.20 | 1.51633 | 64.1 |
| image plane | ∞ | | | | aspherical surface data

13th surface

K = 0.00000e+000  A4 = −2.85339e−005  A6 = −1.11459e−007
A8 = 7.62958e−010  A10 = −5.61082e−012

14th surface

K = 0.00000e+000  A4 = 4.63725e−005  A6 = −1.42645e−007
A8 = 1.52542e−009  A10 = −7.17975e−012

24th surface

K = 0.00000e+000  A4 = −1.23278e−004  A6 = −7.70389e−007
A8 = 2.13878e−008

25th surface

K = 0.00000e+000  A4 = 2.46643e−004  A6 = −2.73811e−006
A8 = 4.14464e−008 various pieces of data
zoom ratio 7.85

| | wide angle | intermediate zoom position | telephoto |
|---|---|---|---|
| focal length | 3.95 | 20.03 | 31.00 |
| F-number | 1.64 | 3.14 | 4.30 | unit: mm

| | | | |
|---|---|---|---|
| half angle of view | 58.2 | 12.50 | 8.06 |
| image height | 4.6 | 4.6 | 4.6 |
| total lens length | 119.58 | 119.58 | 119.58 |
| BF (air) distance | 6.65 | 5.86 | 5.49 |
| d3 | 0.75 | 38.48 | 34.62 |
| d11 | 58.77 | 7.93 | 1.90 |
| d21 | 2.29 | 16.19 | 26.45 |
| d25 | 2.13 | 1.35 | 0.97 | lens unit data

| unit | focal length |
|---|---|
| 1 | 234.35 |
| 2 | −12.46 |
| 3 | 17.18 |
| 4 | 28.49 |

Third Numerical Example unit: mm surface data

| surface number | r | d | nd | vd |
|---|---|---|---|---|
| 1 | 25.293 | 3.90 | 1.63854 | 55.4 |
| 2 | 29.828 | (variable) | | |
| 3 | 26.303 | 0.80 | 2.00100 | 29.1 |
| 4 | 9.864 | 6.14 | | |
| 5 | 564.528 | 0.70 | 1.88300 | 40.8 |
| 6 | 19.687 | 3.65 | | |
| 7 | −21.141 | 0.70 | 1.49700 | 81.5 |
| 8 | 39.568 | 0.15 | | |
| 9 | 28.677 | 3.17 | 1.95906 | 17.5 |
| 10 | −245.532 | (variable) | | |
| 11 (aperture stop) | ∞ | 0.15 | | |
| 12* | 10.789 | 4.43 | 1.49710 | 81.6 |
| 13* | −26.68 | 0.15 | | |
| 14 | 12.741 | 0.50 | 1.65412 | 39.7 |
| 15 | 7.808 | 0.47 | | |
| 16 | 7.818 | 1.95 | 1.91082 | 35.3 |
| 17 | 12.648 | 0.97 | | |
| 18 | 21.413 | 0.45 | 2.00100 | 29.1 |
| 19 | 6.194 | 3.77 | 1.49700 | 81.5 |
| 20 | −28.064 | (variable) | | |
| 21* | −9.729 | 3.00 | 1.69350 | 53.2 |
| 22* | −10.45 | (variable) | | |
| 23 | −14.742 | 1.15 | 1.49700 | 81.5 |
| 24 | −8.92 | 1.00 | | |
| 25 | ∞ | 1.20 | 1.51633 | 64.1 |
| image plane | ∞ | | | | aspherical surface data

12th surface

K = 0.00000e+000  A4 = −6.61378e−005  A6 = −1.41031e−006
A8 = 3.40820e−008  A10 = −5.71142e−010

13th surface

K = 0.00000e+000  A4 = 9.02773e−005  A6 = −1.13400e−006
A8 = 3.03683e−008  A10 = −5.20683e−010

21st surface

K = 0.00000e+000  A4 = 6.40599e−004  A6 = 7.69572e−006
A8 = 2.55381e−007  A10 = −1.66126e−008

22nd surface

K = 0.00000e+000  A4 = 8.54693e−004  A6 = 3.92456e−006
A8 = 4.26617e−007  A10 = −1.39766e−008

-continued unit: mm various pieces of data
zoom ratio 8.2

|  | wide angle | intermediate zoom position | telephoto |
|---|---|---|---|
| focal length | 2.91 | 11.35 | 23.71 |
| F-number | 1.51 | 2.38 | 3.99 |
| half angle of view | 59.4 | 15.6 | 7.46 |
| image height | 3.2 | 3.2 | 3.2 |
| total lens length | 82.99 | 88.43 | 82.99 |
| BF (air) distance | 5.44 | 5.44 | 5.44 |
| d2 | 1.71 | 24.85 | 15.52 |
| d10 | 41.79 | 8.70 | 1.10 |
| d20 | 1.36 | 11.32 | 29.48 |
| d22 | 1.95 | 1.93 | 0.70 | lens unit data

| unit | focal length |
|---|---|
| 1 | 195.1 |
| 2 | −8.6 |
| 3 | 14.0 |
| 4 | 288.8 |
| 5 | 42.7 |

Fourth Numerical Example unit: mm surface data

| surface number | r | d | nd | vd |
|---|---|---|---|---|
| 1 | 49.555 | 4.37 | 1.69680 | 55.5 |
| 2 | 78.726 | (variable) | | |
| 3 | 39.833 | 1.30 | 1.91082 | 35.3 |
| 4 | 14.149 | 4.33 | | |
| 5 | 20.407 | 0.90 | 1.77250 | 49.6 |
| 6 | 11.996 | 7.06 | | |
| 7 | −55.904 | 0.70 | 1.83481 | 42.7 |
| 8 | 16.432 | 3.22 | 1.95906 | 17.5 |
| 9 | 64.489 | (variable) | | |
| 10 (aperture stop) | ∞ | 1.03 | | |
| 11* | 11.954 | 3.67 | 1.49710 | 81.6 |
| 12* | −38.954 | 2.86 | | |
| 13 | 9.341 | 2.43 | 1.49700 | 81.5 |
| 14 | 19.834 | 0.45 | 2.00100 | 29.1 |
| 15 | 8.332 | 4.05 | | |
| 16 | 13.395 | 6.02 | 1.59522 | 67.7 |
| 17 | −27.183 | (variable) | | |
| 18* | −36.005 | 0.67 | 1.55332 | 71.7 |
| 19* | 47.326 | (variable) | | |
| 20 | ∞ | 1.44 | 1.51633 | 64.1 |
| image plane | ∞ | | | | aspherical surface data

11th surface

K = −6.42118e−001  A4 = −1.70544e−005  A6 = 2.64570e−008
A8 = −2.14831e−010

12th surface

K = 1.53747e+000  A4 = 3.78429e−005  A6 = −1.04281e−008
A8 = −5.92943e−010

18th surface

K = 5.52229e+000  A4 = −3.34129e−004  A6 = −1.84867e−010
A8 = 1.71488e−007

19th surface

K = −1.70338e+001  A4 = −2.06412e−004  A6 = 1.93520e−007
A8 = 1.98920e−007 various pieces of data
zoom ratio 9.6

|  | wide angle | intermediate zoom position | telephoto |
|---|---|---|---|
| focal length | 3.11 | 13.6 | 29.81 |
| F-number | 1.65 | 2.68 | 4.50 |
| half angle of view | 58.5 | 14.3 | 6.51 |
| image height | 3.4 | 3.4 | 3.4 |
| total lens length | 103.97 | 103.47 | 103.97 |
| BF (air) distance | 3.11 | 18.28 | 29.81 |
| d2 | 0.50 | 28.31 | 17.24 |
| d9 | 52.05 | 11.39 | 1.50 |
| d17 | 1.66 | 2.44 | 6.20 |
| d19 | 1.46 | 13.52 | 30.73 | lens unit data

| unit | focal length |
|---|---|
| 1 | 180.81 |
| 2 | −9.06 |
| 3 | 16.16 |
| 4 | −36.85 |

TABLE 1

| CONDITIONAL EXPRESSIONS | | FIRST EXEMPLARY EMBODIMENT | SECOND EXEMPLARY EMBODIMENT | THIRD EXEMPLARY EMBODIMENT | FOURTH EXEMPLARY EMBODIMENT |
|---|---|---|---|---|---|
| (1) | M3/f3 | 1.50 | 1.34 | 1.92 | 2.09 |
| (2) | M2mt/f2 | 0.50 | 0.31 | 1.08 | 1.22 |
| (3) | Nd2p | 1.959 | 1.959 | 1.959 | 1.959 |
| (4) | vd2p | 17.5 | 17.5 | 17.5 | 17.5 |
| (5) | f1/f2 | −17.5 | −18.8 | −22.6 | −20.0 |
| (6) | f2/fw | −3.21 | −3.15 | −2.97 | −2.92 |
| (7) | TL1G/fw | 1.32 | 2.51 | 1.34 | 1.41 |
| (8) | f31/f3 | 1.14 | 1.08 | 1.15 | 1.17 |
| (9) | v3p − v3n | 52.4 | 52.4 | 52.4 | 52.4 |
| (10) | |f3/f4| | 0.34 | 0.60 | 0.05 | 0.44 |
| (11) | (tanωW/tanωT)/(β3t/β3w) | 1.07 | 0.88 | 0.83 | 1.22 |

Next, an exemplary embodiment of a monitoring camera (image pickup apparatus) that includes, as an image pickup optical system, a zoom lens according to an exemplary embodiment of the present invention will be described with reference to FIG. 9. Illustrated in FIG. 9 are a monitoring camera body 10 and an image pickup optical system 11 that is constituted by the zoom lens described in any one of the first through fourth exemplary embodiments. A solid-state image pickup element (photoelectric conversion element) 12 is embedded in the camera body and is constituted by a CCD sensor, a CMOS sensor, or the like that receives an object image formed by the image pickup optical system 11. A memory 13 stores information related to the object image that has been subjected to photoelectric conversion by the solid-state image pickup element 12. A network cable 14 is provided for transferring information stored in the memory 13.

In this manner, by applying a zoom lens according to an exemplary embodiment of the present invention in an image pickup apparatus, such as a monitoring camera, an image pickup apparatus that is small in size, has a high zoom ratio, and has high optical performance can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-132148, filed Jun. 30, 2015, which is hereby incorporated by reference herein in its entirety.

What is claimed is:

1. A zoom lens, comprising, in order from an object side to an image side:
   a first lens unit having a positive refractive power;
   a second lens unit having a negative refractive power and including a positive lens and at least two negative lenses; and
   a third lens unit having a positive refractive power,
   wherein a distance between adjacent lens units being configured to change during zooming,
   wherein, during zooming, the first lens unit is stationary,
   wherein, during zooming from a wide angle end to a telephoto end, the second lens unit is configured to move toward the image side and then to move toward the object side, and the third lens unit is configured to move toward the object side, and
   wherein, when an amount of movement of the third lens unit during zooming from the wide angle end to the telephoto end is represented by M3 and a focal length of the third lens unit is represented by f3, a conditional expression $1.30 < M3/f3 < 3.00$ is satisfied.

2. The zoom lens according to claim 1,
   wherein, when an amount of movement of the second lens unit during zooming from a zoom position at which the second lens unit is located closest to the image side to the telephoto end is represented by M2mt and a focal length of the second lens unit is represented by f2, a conditional expression $0.10 < M2mt/f2 < 2.00$ is satisfied.

3. The zoom lens according to claim 1,
   wherein, when a refractive index of a material of the positive lens included in the second lens unit with respect to a d line is represented by Nd2p and an Abbe number of the material is represented by vd2p, the positive lens included in the second lens unit is a lens that satisfies conditional expressions $1.84 < Nd2p < 2.30$ and $5.0 < vd2p < 25.0$.

4. The zoom lens according to claim 1,
   wherein, when a focal length of the first lens unit is represented by f1 and a focal length of the second lens unit is represented by f2, a conditional expression $-35.0 < f1/f2 < -8.0$ is satisfied.

5. The zoom lens according to claim 1,
   wherein, when a focal length of the second lens unit is represented by f2 and a focal length of the zoom lens at the wide angle end is represented by fw, a conditional expression $-8.00 < f2/fw < -0.80$ is satisfied.

6. The zoom lens according to claim 1,
   wherein, when a total thickness, along an optical axis, of a lens included in the first lens unit is represented by TL1G and a focal length of the zoom lens at the wide angle end is represented by fw, a conditional expression $0.70 < TL1G/fw < 4.00$ is satisfied.

7. The zoom lens according to claim 1,
   wherein a positive lens is disposed closest to the object side in the third lens unit,
   wherein the third lens unit includes a cemented lens component in which a positive lens and a negative lens are cemented, and
   wherein, when a focal length of the positive lens disposed closest to the object side in the third lens unit is represented by f31, an Abbe number of a material of the positive lens included in the cemented lens component is represented by v3p, and an Abbe number of a material of the negative lens included in the cemented lens component is represented by v3n, conditional expressions $0.70 < f31/f3 < 1.80$ and $28.0 < v3p - v3n < 65.0$ are satisfied.

8. The zoom lens according to claim 1,
   wherein the zoom lens consists of a first lens unit having a positive refractive power, a second lens unit having a negative refractive power, a third lens unit having a positive refractive power, and a fourth lens unit having a positive refractive power, the first through fourth lens units being arranged in order from the object side to the image side.

9. The zoom lens according to claim 1,
   wherein the zoom lens consists of a first lens unit having a positive refractive power, a second lens unit having a negative refractive power, a third lens unit having a positive refractive power, and a fourth lens unit having a negative refractive power, the first through fourth lens units being arranged in order from the object side to the image side.

10. The zoom lens according to claim 1,
    wherein the zoom lens consists of a first lens unit having a positive refractive power, a second lens unit having a negative refractive power, a third lens unit having a positive refractive power, a fourth lens unit having a positive refractive power, and a fifth lens unit having a positive refractive power, the first through fifth lens units being arranged in order from the object side to the image side.

11. The zoom lens according to claim 8,
    wherein, when a focal length of the fourth lens unit is represented by f4, a conditional expression $0.02 < |f3/f4| < 0.95$ is satisfied.

12. The zoom lens according to claim 9,
    wherein, when a focal length of the fourth lens unit is represented by f4, a conditional expression $0.02 < |f3/f4| < 0.95$ is satisfied.

13. The zoom lens according to claim 10,
wherein, when a focal length of the fourth lens unit is represented by f4, a conditional expression $0.02<|f3/f4|<0.95$ is satisfied.

14. The zoom lens according to claim 1,
wherein the first lens unit consists of a positive lens having a meniscus shape that projects toward the object side.

15. The zoom lens according to claim 1,
wherein the first lens unit consists of a cemented lens component in which a positive lens and a negative lens are cemented,
wherein a surface of the cemented lens component closest to the object side has a convex shape, and
wherein a surface of the cemented lens component closest to the image side has a concave shape.

16. An image pickup apparatus, comprising:
a zoom lens; and
an image pickup element configured to receive an image formed by the zoom lens,
the zoom lens comprising, in order from an object side to an image side:
  a first lens unit having a positive refractive power,
  a second lens unit having a negative refractive power and including a positive lens and at least two negative lenses, and
  a third lens unit having a positive refractive power,
wherein a distance between adjacent ones of the first through third lens units changes during zooming,
wherein, during zooming, the first lens unit is stationary
wherein, during zooming from a wide angle end to a telephoto end, the second lens unit is configured to move toward the image side and then to move toward the object side, and the third lens unit is configured to move toward the object side, and
wherein, during an amount of movement of the third lens unit when zooming from the wide angle end to the telephoto end is represented by M3 and a focal length of the third lens unit is represented by f3, a conditional expression $1.30<M3/f3<3.00$ is satisfied.

17. The image pickup apparatus according to claim 16,
wherein, when a half angle of view at the wide angle end is represented by $\omega W$, a half angle of view at the telephoto end is represented by $\omega T$, a lateral magnification of the third lens unit at the wide angle end is represented by $\beta 3w$, and a lateral magnification of the third lens unit at the telephoto end is represented by $\beta 3t$, a conditional expression $0.50<(\tan \omega W/\tan \omega T)/(\beta 3t/\beta 3w)<1.70$ is satisfied.

18. The zoom lens according to claim 1, further comprising a fourth lens unit having a positive or negative refractive power arranged on the image side of the third lens unit.

* * * * *